US012580688B1

(12) United States Patent
Myers et al.

(10) Patent No.: US 12,580,688 B1
(45) Date of Patent: Mar. 17, 2026

(54) TIME SYNCHRONIZATION OF DATA WITHIN COMMUNICATION SYSTEMS

(71) Applicant: Amazon Technologies, Inc., Seattle, WA (US)

(72) Inventors: Kyle Regan Myers, San Diego, CA (US); Samuel Douglas Crowder, Austin, TX (US); Prashant Bhargava, Austin, TX (US); Jin Wu, San Diego, CA (US); Swaminathan Nagarajan, Austin, TX (US); Youn-Ki Hong, Mission Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 18/489,699

(22) Filed: Oct. 18, 2023

(51) Int. Cl.
*H04L 1/1607* (2023.01)
*H04L 5/00* (2006.01)

(52) U.S. Cl.
CPC .......... *H04L 1/1678* (2013.01); *H04L 5/0055* (2013.01)

(58) Field of Classification Search
None
See application file for complete search history.

(56) References Cited

U.S. PATENT DOCUMENTS

| | | | | |
|---|---|---|---|---|
| 2011/0075616 | A1* | 3/2011 | Baldwin | H04W 88/085 |
| | | | | 370/503 |
| 2016/0095033 | A1* | 3/2016 | Kadiri | H04L 47/32 |
| | | | | 370/331 |
| 2016/0294511 | A1* | 10/2016 | Maheshwari | H04L 69/22 |
| 2025/0106691 | A1* | 3/2025 | Vaez-Ghaemi | H04W 24/08 |

FOREIGN PATENT DOCUMENTS

| | | | | |
|---|---|---|---|---|
| WO | WO-9952181 | A2 * | 10/1999 | H04B 7/18515 |
| WO | WO-2004017638 | A1 * | 2/2004 | H04N 21/440254 |
| WO | WO-2014005759 | A1 * | 1/2014 | H04J 3/0661 |

* cited by examiner

*Primary Examiner* — Guerrier Merant
(74) *Attorney, Agent, or Firm* — Kilpatrick Townsend & Stockton LLP

(57) ABSTRACT

Technologies directed to data packet verification and synchronization within a communication subsystem are described. A processing device, coupled to a SerDes interface, receives a data packet including a timestamp and error correction information. The timestamp indicates a first time when a first sample of the data packet is to be sent by the communication subsystem. The processing device sends the data packet responsive to a determination that the time indicated by the timestamp is equal to a current local time of the processing device. The processing device discards the data packet responsive to a determination that the time indicated by the timestamp is not (i) after the current local time of the processing device and (ii) before a cutoff time.

18 Claims, 12 Drawing Sheets

| [63:56] | [55:52] | [51:48] | [47:32] | [31:0] |
|---------|---------|---------|---------|--------|
| ECC<br>710 | VERSION<br>708 | STREAM_ID<br>706A | RESERVED<br>704 | TIME_TO_TRANSMIT<br>702 |

700A

| [63:56] | [55:52] | [51:48] | [47:44] | [43:32] | [31:0] |
|---------|---------|---------|---------|---------|--------|
| ECC<br>710 | VERSION<br>708 | STREAM_ID<br>706B | MODE<br>714 | RESERVED<br>704 | TIME_OF_RECEIPT<br>712 |

700B

TIME SYNCHRONIZATION OF DATA WITHIN COMMUNICATION SYSTEMS

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

Satellite-based broadband internet constellations are being developed to provide high-speed, low-latency broadband internet access to locations around the world using a network of low Earth orbit (LEO) satellites, ground stations, and user terminals (also called customer terminals (CTs).

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
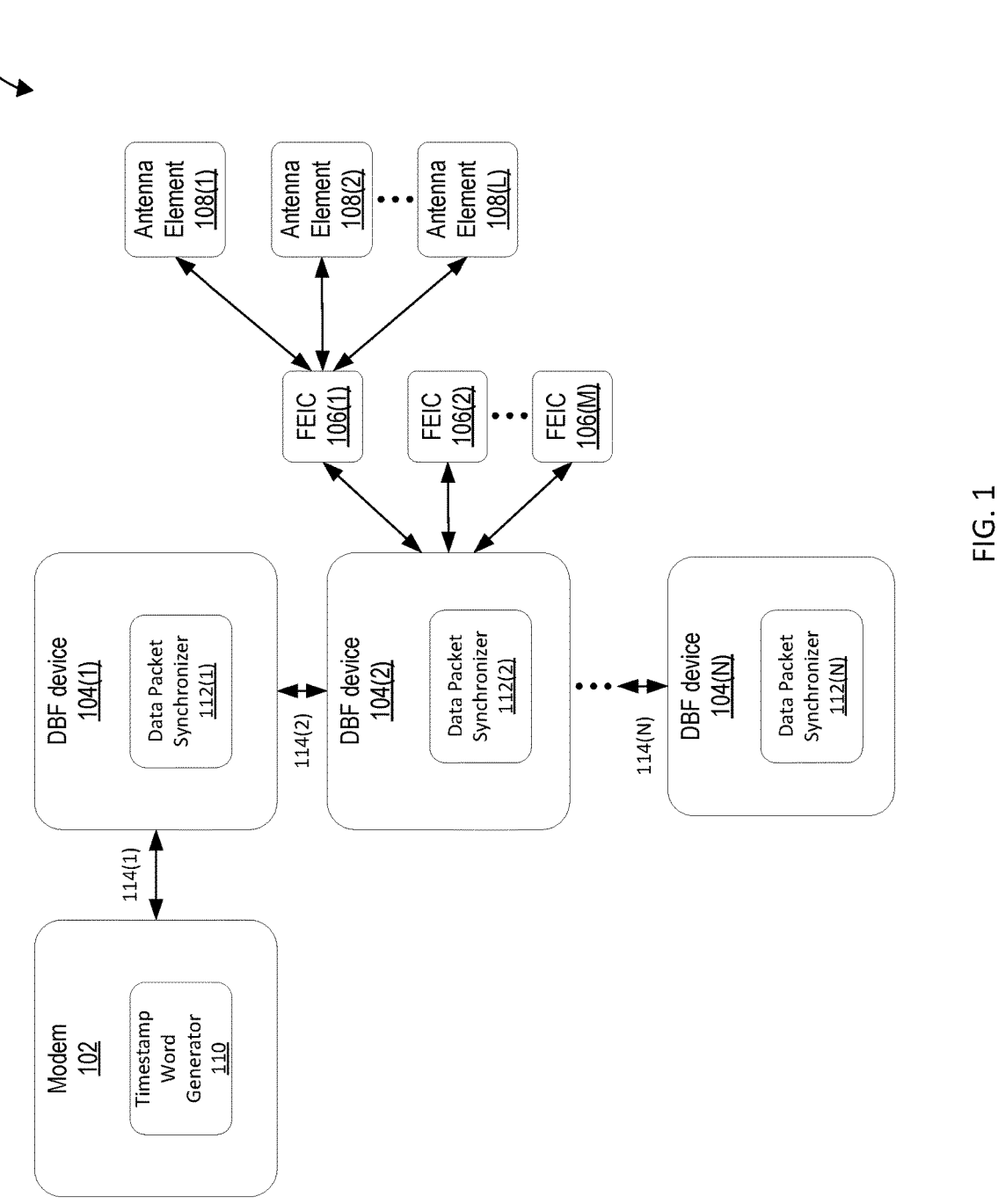
FIG. 1 illustrates a block diagram of a communication subsystem of a beamforming system, including a modem, multiple digital beamforming (DBF) devices, multiple front-end integrated circuits (FEICs), and multiple antenna elements according to one embodiment.

Technologies directed to time synchronization of signals transmitted and received within a wireless communication system are described.

Wireless communication systems that utilize antenna arrays can include hundreds or thousands of antenna elements. Signals transmitted or received by the antenna arrays must be time-synchronized across all antenna elements-if not, the signal is corrupted and wireless communication fails. Each antenna element is typically coupled to a DBF device that controls time-synchronization of a subset of antenna elements on the antenna array. Because a typical antenna array has multiple DBF devices, each DBF device must coordinate simultaneous transmission (e.g., be time-synchronized) of signals with respect to the other DBF devices. If a DBF device becomes unsynchronized with other DBF devices during signal transmission, the signal-to-noise ratio (SNR) of the wireless communication system is significantly hampered, and the signal may be corrupted. While continuous time-synchronization of all DBF devices is ideal to maintain time-synchronization across all DBF devices, data routing through the wireless communication system (e.g., sending data via SerDes links or another high-speed data transmission device) inevitably leads to dropped or corrupted data, which impacts the time-synchronization of the DBF devices.

Conventionally, time synchronization between DBF devices in a beamforming system is achieved using an implicit timing scheme where each DBF device counts the number of samples received since a first samples was received. This conventional method has a significant failure mode—the count of symbols can be wrong. As stated above, data (e.g., in-phase and quadrature (IQ) data in a stream of a predetermined number of data samples) can be partially or fully lost or dropped during data routing before a DBF device receives the data, causing inaccuracies in the number of symbols received. Such errors, even if extremely unlikely to occur in a specific instance, are inevitable in beamforming systems utilizing hundreds or thousands of antenna elements. This, in turn, causes the DBF device to transmit symbols at the wrong time and corrupt the beamformed signal by (i) failing to simultaneously send a desired signal at the same time as other DBF devices, slightly lowering SNR, and (ii) introducing large amounts of noise by transmitting the wrong signal, significantly lowering SNR.

Conventionally, this failure is corrected by stopping the entire transmission stream of the beamforming system, resetting the sample counter of each DBF device, and restarting the transmission stream. However, the DBF device may not detect this failure unless the sample count is so drastically incorrect as to cause a buffer on the DBF to overflow or underflow. Thus, if the sample count is incorrect but not enough to cause the buffer on the DBF to overflow or underflow, the DBF device does not detect that its sample count is incorrect and transmits symbols at the wrong time, effectively creating noise indefinitely in the wireless communication system.

Aspects and embodiments of the present disclosure can overcome these deficiencies and others by adding a timestamp to each data packet (e.g., each set of IQ samples)

before each data packet is sent to a DBF device. This timestamp is considered an express timestamp since it becomes part of the data packet. So, when DBF device receives a data packet from a SerDes interface (or any high-speed data transmission interface), the DBF device sends the data packet at a time indicated by the timestamp. Specifically, a first IQ sample of the data packet may be sent at the time indicated by the timestamp. In particular, if the time indicated by the timestamp is greater than a current local time (e.g., subsequent to the current local time) but less than (e.g., before, preceding) a cutoff time, the DBF device waits until the time indicated by the timestamp is equal to (e.g., identical to) the current local time and then sends the data packet. For example, if the time indicated by the timestamp word is greater than the current local time but less than the cutoff time, the data packet is sent at a subsequent local time to the current local time. If the time indicated by the timestamp is less than the current local time of the DBF device or greater than the cutoff time, the DBF device discards the data packet.

Aspects and embodiments of the present disclosure can include a processing device (e.g., a DBF device, a modem) that receives a data packet from each of multiple SerDes interfaces coupled to the processing device. The processing device discards each data packet that has a timestamp with an uncorrectable error (e.g., unexpected sample values within the data packet, incorrect timestamp, too many or too few symbols within the data packet). The processing device then generates a combined data packet using each data packet without an uncorrectable error and sends the combined data packet to a second processing device (e.g., a modem, an upstream DBF device, a separate processing device within the same modem, or the like).

Aspects and embodiments of the present disclosure can provide a solution to the deficiencies explained above and others. First, even though the DBF device may discard a data packet completely and fail to transmit the desired signal (which slightly affects SNR), this is desirable compared to the DBF device transmitting a wrong signal (which significantly affects SNR). Second, the DBF device immediately detects partially or fully dropped packets, eliminating the risk of perpetual noise in the wireless communication system. Third, rather than forcing a system-wide shutdown of the wireless communication system, the issues related to missing or corrupted symbols are automatically accounted for at the DBF device experiencing the error(s).

FIG. 1 illustrates a block diagram of a communication subsystem of a beamforming system 100, including a modem 102, multiple digital beamforming (DBF) devices 104, multiple front-end integrated circuits (FEICs) 106, and multiple antenna elements 108 according to one embodiment. The subsystem of the beamforming system 100 may be within a wireless satellite communication environment. The modem 102 is coupled to a first DBF device 104(1) over a first SerDes link 114(1) (e.g., a first SerDes connection). The SerDes links can include one or more SerDes connections. The first DBF device 104 is coupled to a second DBF device 104(2) over a second SerDes link 114(2) (e.g., a second SerDes connection). The second DBF device 104(2) can be coupled to one or more additional DBF devices 104(N), where N is a positive integer, over one or more additional SerDes connections 114(N). While the described embodiment utilizes SerDes links, the SerDes links may be replaced with any other method of high-speed data transmission, such as parallel transmission, optical transmission, low-voltage differential signaling (LVDS), or pulse amplitude modulation (PAM). The specific choice of data transmission technique depends on the specific requirements of the given application (e.g., desired data rate, distance between communicating devices, power consumption). Each of the DBF devices 104 can be coupled to one or more FEICs 106. For example, the second DBF device 104(2) is coupled to M number of FEICs 106(1)-106(M), where M is a positive integer. For example, each DBF device 104 can be coupled to nine FEICs 106. The DBF devices 104 can be coupled to the FEIC 106 over a wired connection, such as a circuit board trace or a transmission line that is coupled between the DBF device 104 and the FEIC 106. Each of the FEICs 106 can be coupled to one or more antenna elements 108. For example, the first FEIC 106(1) can be coupled to four antenna elements 108(1)-108(4). The FEIC 106 can be coupled to the antenna element 108 over a wired connection, such as a circuit board trace or a transmission line between the FEIC 106 and the antenna element 108.

In the illustrated embodiment, the first DBF device 104(1) is considered to be a modem entry. A modem entry is a DBF device that connects to one or more modems of the panel. The modem entry is an ingress and egress for data signals and control signals to and from a modem to which it is connected (i.e., modem 102 in the illustrated embodiment).

In one embodiment, a first set of antenna elements is coupled to a first front-end radio frequency (RFFE) circuit of a first set of RFFE circuits coupled to the first DBF device 104(1). A second set of antenna elements is coupled to a second RFFE circuit of the first set. A third set of antenna elements is coupled to a first RFFE circuit of the second set of RFFE circuits (e.g., FEIC 106(1)-(M)). It should be noted that in another embodiment, the DBF devices can couple directly to the antenna elements without the RFFE circuits. Some or all of the functionality of the set of RFFE circuits can be implemented in the DBF devices. The DBF devices 104 can be part of a TX panel. In the TX panel, the first DBF device 104(1) is configured to receive a first data stream from the modem 102 over the first SerDes 114(1), send the first data stream to the second DBF device 104(2) over the second SerDes link 114(2) and send at least a portion of the first data stream to the first set of RFFE circuits. In another embodiment, the DBF devices 104 can be part of a RX panel. In the RX panel, the first DBF device 104(1) is configured to receive a first data stream from the first set of RFFE circuits, receive a second data stream from the second DBF device 104(2) over the second SerDes link 114(2), and send a combined data stream to the modem 102 over the first SerDes 114(1). The combined data stream includes at least a portion of the first data stream and at least a portion of the second data stream.

In another embodiment, the first DBF device 104(1) includes a digital signal processing (DSP) unit and a memory device coupled to the DSP unit. The DSP unit is configured to receive a first data stream from the first set of RFFE circuits, process the first data stream, and store the first data stream in the memory device. The DSP unit also receives a second data stream from the second DBF device 104(2) over the second SerDes link 114(2). The DSP unit combines, into a combined data stream, a portion of the first data stream and a portion of the second data stream, and outputs the combined data stream to the modem 102 over the first SerDes 114(1).

It should also be noted that FIG. 1 shows only two of the SerDes links of the first DBF device 104(1) and the second DBF device 104(2). Each of the DBF devices 104 can include more than two SerDes links. For example, the first DBF device 104(1) can include four SerDes links, a first SerDes link (e.g., bidirectional SerDes link) to connect to a first device (e.g., modem 102), a second SerDes link to connect to a second device (e.g., DBF device 104(2)), a third SerDes link to connect to a third device (e.g., a third DBF device not shown), and a fourth SerDes link to connect to a fourth device (e.g., a third DBF device not shown). The modem 102 and the DBF devices 104 can form a chain of DBF devices.

In some embodiments, the modem 102 comprises a timestamp word generator 110. The modem 102 may receive signal data (e.g., IQ data) from upstream circuitry, such as a host device. The modem 102 is configured to send the signal data to downstream circuitry, such as the DBF devices 104, in the form of data packets. The modem may receive the signal data already in the form of data packets. Each data packet sent by the modem 102 to the DBF devices 104 is expected to conform to certain length and formatting requirements. Once the modem 102 has a data packet to be transmitted, the timestamp word generator 110 generates a timestamp word to be added to the data packet. The timestamp word can include at least a timestamp, but can also include additional information as described herein. A timestamp can be a digital value that represents a point in time. It should be noted that although referred to as "timestamp word," the timestamp word generator 110 can generates timestamp information of any number of bits. In some embodiments, the modem 102 creates an updated data packet (e.g., a second data packet) that includes both the data packet and the timestamp word. The timestamp word can be placed as a header within the fresh data packet. In other embodiments, the timestamp word is placed at the end of the fresh data packet. After creating the fresh data packet, the fresh data packet is sent to the first DBF device 104(1) via the SerDes link 114(1), where the fresh data packet is then forwarded to each DBF device in the DBF device chain. It is assumed that data packets, as described herein, are presumed to have a timestamp word unless expressed otherwise.

The timestamp word indicates a time at which the data packet is to be transmitted. In at least one embodiment, the time indicated by the timestamp corresponds to an exact value of a DSP clock timer. The DSP clock timer may be local to the modem 102. In some embodiments, the modem 102 may have a DSP clock input that receives a current time of the DSP clock timer located on a separate processing device (e.g., a host device). The DSP clock timer may be kept at modulo $2^{32}$ and wrap back to zero (0) when the maximum value is reached. The time indicated by the timestamp may also be associated with a real-world time (e.g., a time expressed in conventional time units, such as hours, minutes, or seconds).

The timestamp word may also include error correction information, such as an error correction code (ECC). The ECC may be a shortened Hamming code calculated over the complete timestamp word. In some embodiments, the ECC is 8-parity bits, and the complete timestamp word, excluding the ECC, is 56 bits (e.g., 64 bits minus the 8-parity bits). In one embodiment, the ECC provides correction and detection of errors throughout the entire data packet. In another embodiment, the ECC provides correction and detection of error only in the timestamp word. The ECC provides correction for all single-bit errors and detection of all even-numbered bit errors. The ECC also provides detection of around fifty percent (50%) of odd-number bit errors, excluding single-bit errors.

The timestamp word may also include metadata that provides information about the data packet. For example, the timestamp word may include metadata regarding (i) a version of the timestamp word or the data packet and (ii) identifies the modem 102 (or a modem group that includes the modem 102) as the origin of the data packet. Additionally, the timestamp word may have a predetermined length (e.g., 16 bits, 32 bits, 64 bits, 128 bits, etc.).

Each DBF device may include a data packet synchronizer 112. In some embodiments, the DBF device 104 may receive the data packet from a SerDes link 114. Upon the DBF device 104 receiving the data packet, the data packet synchronizer 112 performs several validity checks of the data packet to determine whether the data packet synchronizer 112 should send the data packet to downstream circuitry (e.g., FEIC 106(1)-(M), antenna elements 108(1)-(L)). As a first validity check, the data packet synchronizer 112 checks the data packet for errors with the ECC. If there are correctable errors, the data packet synchronizer 112 corrects those errors. If there are uncorrectable errors, the data packet synchronizer 112 discards the data packet, and the data packet is not sent to downstream circuitry. The data packet may be discarded in a variety of ways, such as via deletion, removing the data packet from the packet buffer, incrementing a counter, flagging the data packet as corrupted, or overwriting the data packet with other data. The DBF device 104 may include resettable counter to track how many data packets are found invalid and have been discarded. If there are no errors (e.g., correctable errors have been corrected or no errors were initially detected with the ECC), the data packet synchronizer 112 moves to a second validity check. For the second validity check, the data packet synchronizer 112 determines if metadata values within the timestamp word are unexpected. If any metadata values are unexpected, the data packet synchronizer 112 will discard the data packet, and the data packet is not sent to downstream circuitry. For example, if a metadata value within the timestamp word indicates that the timestamp word is a version unknown to the DBF device 104, the data packet synchronizer 112 will discard the data packet to avoid transmitting a possibly corrupted data packet and significantly impacting the SNR of the beamforming system. The validity checks are explained in more detail with regard to FIGS. 2-3.

Once the data packet synchronizer 112 of the DBF device 104 has performed the above validity checks, if the data packet was not discarded, the data packet may be ready to send to a packet buffer (e.g., same or similar to packet buffer 402 of FIG. 4) within the DBF device 104. The packet buffer may be an element of the data packet synchronizer 112. Before the data packet synchronizer 112 sends the data packet to the packet buffer, the data packet synchronizer 112 may determine whether the packet buffer has sufficient space to accept the data packet without overflowing. This may be considered a third validity check. In some embodiments, the packet buffer is large enough to accept and hold four data packets simultaneously. In other embodiments, the packet buffer may only be large enough to accept and hold less than four data packets (e.g., a single data packet) simultaneously. In other embodiments, the packet buffer may be large enough to accept and hold more than four data packets simultaneously. If the data packet synchronizer 112 determines that the packet buffer does not have sufficient space for the data packet, the data packet synchronizer 112 may discard the data packet.

In some embodiments, the data packet synchronizer 112 provides one or more timing checks (e.g., synchronization checks) after performing the validity checks. In other embodiments, the one or more timing checks are provided after the validity checks. In at least one of these embodiments, the timing checks are provided after the data packet is sent to the packet buffer. The one or more timing checks determine whether the data packet (i) is to be immediately sent, (ii) is to be sent in the near future, or (iii) was supposed to be sent in the past or is to be sent in the far future. In one embodiment, the timing checks are performed by the data packet synchronizer 112, comparing the time indicated by the timestamp to a DSP clock timer local to the DBF device 104. In another embodiment, the data packet synchronizer 112 compares the time indicated by the timestamp to a packet counter that increments each time a new data packet is received by the DBF device 104. In even another embodiment, the data packet synchronizer 112 compares the time indicated by the timestamp to a real-world clock. In each of these embodiments, it may be said that the data packet synchronizer 112 compares the time indicated by the timestamp to a current local time of the DBF device 104. Each DBF device 104 may have a DSP clock timer that is synchronized to the same count value on the same clock cycle. Each DBF may share a common reference clock to keep the DSP clock timers synchronized. If the data packet is to be immediately sent, the data packet synchronizer 112 causes the data packet to be sent to downstream circuitry (e.g., FEIC 106, Antenna Elements 108) and transmitted. If the data packet is to be sent in the near future, the data packet synchronizer 112 causes the data packet to be held (e.g., in the packet buffer) until the data packet is to be sent. If the data packet was supposed to be sent in the past or is to be sent in the far future, the data packet synchronizer 112 discards the data packet. The one or more timing checks are explained in more detail with regard to FIGS. 2 and 4.

Illustrated in FIG. 1 is a chain of DBF devices 104 connected to a modem 102 by the first SerDes link 114(1). In at least one embodiment of a communication subsystem, the communication subsystem may include a second chain of DBF devices (not shown) coupled to a second modem (not shown) by a SerDes link (not shown). The second chain of DBF devices and the second modem may be configured substantially similarly to the modem 102 and chain of DBF devices 104 of FIG. 1. The modem 102 and the second modem may form a modem group (e.g., a group of modems that work together to control multiple DBF device chains) or be part of a modem group. The modem 102 may further be operatively coupled to the second modem such that the modem 102 may send the data packet to the second modem. Upon receiving the data packet, the second modem may check whether the timestamp word of the data packet matches (e.g., is identical to, is substantially similar to, is close to) what a second timestamp generator of the second modem would have generated (e.g., a value). In some embodiments, the second modem may determine whether the time indicated by the timestamp word matches an expected value of the second modem. If the timestamp word matches what the second timestamp generator would have generated, the second modem (i) adds data that is stored in the second modem (e.g., IQ data that is stored in the second modem) to the data packet and (ii) sends the data packet to the second DBF device chain via the SerDes link.

In the event that the timestamp word does not match what the second timestamp generator would have generated (e.g., a mismatch), the second modem discards the data packet and does not send the data packet to the second DBF device chain. Instead, the second timestamp generator may generate a fresh timestamp word. The fresh timestamp word may correspond to what the second timestamp generator would have generated. The second modem may generate a second fresh data packet containing only data that is stored in the second modem (e.g., no data from the data packet received from the modem 102) and add the fresh timestamp word to the second fresh data packet. The second fresh data packet is then sent to the second DBF device chain via the SerDes link.

In some instances, the data packet sent by the modem 102 may not be received by the second modem. In these instances, the modem 102 may have failed to send the data packet to the second modem, or the data packet may have been dropped in route to the second modem (e.g., a SerDes link between the modem 102 and the second modem may have malfunctioned and dropped the packet). In these cases, the second modem may generate the second timestamp and the second data packet, as described above, and send the second data packet to the second chain of DBF devices via the SerDes link.

Figure 2:
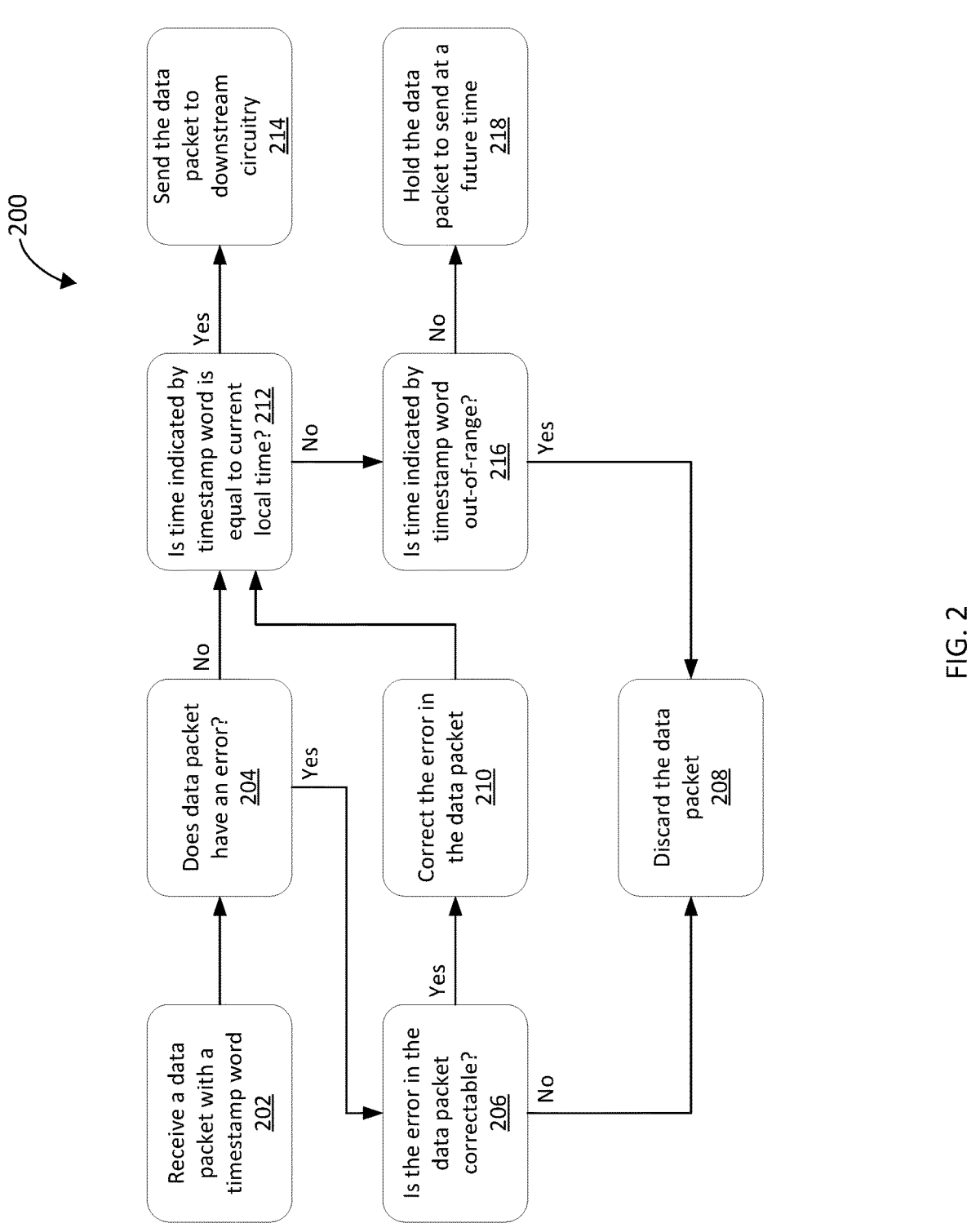
FIG. 2 is a flowchart illustrating data packet handling logic incorporated in a DBF device before transmission (TX) of a data packet with a timestamp, according to one embodiment.

FIG. 2 is a flowchart 200 illustrating data packet handling logic incorporated in the DBF device 104 and the data packet synchronizer 112 before transmission (TX) of a data packet with a timestamp word, according to one embodiment. In a first block 202, the DBF device 104 receives a data packet with a timestamp word. The DBF device may receive the data packet through a SerDes interface connected to a SerDes link 114. After the DBF device 104 receives the data packet, the data packet synchronizer 112 first performs data packet validity checks. At a second block 204, the data packet synchronizer 112 determines or detects whether the data packet has an error. The data packet may have an error, as described above, if the data packet is missing one or multiple bits or has too many bits, or if data values within the data packet are unexpected. If the data packet synchronizer 112 determines that the data packet has an error, the data packet synchronizer 112 determines whether the error is correctable at a third block 206. Correctable errors may be single-bit errors correctable by the ECC. If the error in the data packet is not correctable (e.g., uncorrectable), the DBF device 104 discards the data packet at a fourth block 208. If the error in the data packet is correctable, the data packet synchronizer 112 corrects the error in the data packet at a fifth block 210.

After the DBF device 104 and data packet synchronizer 112 have performed the validity checks and the data packet has not been discarded, the data packet synchronizer 112 determines whether a time indicated by the timestamp word is equal to (e.g., identical to) a local time at a sixth block 212. As explained above, the current local time may be determined by sampling a DSP clock timer local to the DBF device 104. If the time indicated by the timestamp word is equal to the current local time, the DBF device 104 sends the data packet to downstream circuitry at a seventh block 214. The downstream circuitry may be multiple FEICs 106 and antenna elements 108. If the data packet synchronizer 112 determines that the time indicated by the timestamp word is not equal to the local time, the data packet synchronizer 112 may determine whether the time indicated by the timestamp word is out-of-range at an eighth block 216. To determine whether the time indicated by the timestamp word is out-of-range, the data packet synchronizer 112 determines whether the time indicated by the timestamp word is (i) greater than (e.g., after) the current local time and (ii) less than (e.g., before) a cutoff time. In one embodiment, the cutoff time may correspond (e.g., be related to, be associated with) a length or size of a packet buffer (e.g., same or similar to packet buffer 402 of FIG. 4) such that if the time indicated by the timestamp word is greater than the cutoff time, the packet buffer may overflow. In another embodiment, the cutoff time is associated with a length or size smaller than the packet buffer. The cutoff time may be found by offsetting the current local time by a predetermined amount. The current local time and the cutoff time form a predetermined range that determines whether the data packet is discarded or sent to downstream circuitry. The predetermined range between the current local time and the cutoff time, may form an expected time value (e.g., the data packet synchronizer 112 expects that the time indicated by the timestamp word is within the predetermined range between the current local time and the cutoff time). If the time indicated by the timestamp word is not out-of-range, the DBF device 104 holds the data packet to send at a future time at a ninth block 218. The future time may be the time indicated by the timestamp word. As time passes (e.g., a counter is incremented), the data packet synchronizer 112 may again determine whether the time indicated by the timestamp word is equal to the local time at the sixth block 212. If the time indicated by the timestamp is out-of-range, the DBF device 104 discards the data packet at the fourth block 208.

Figure 3:
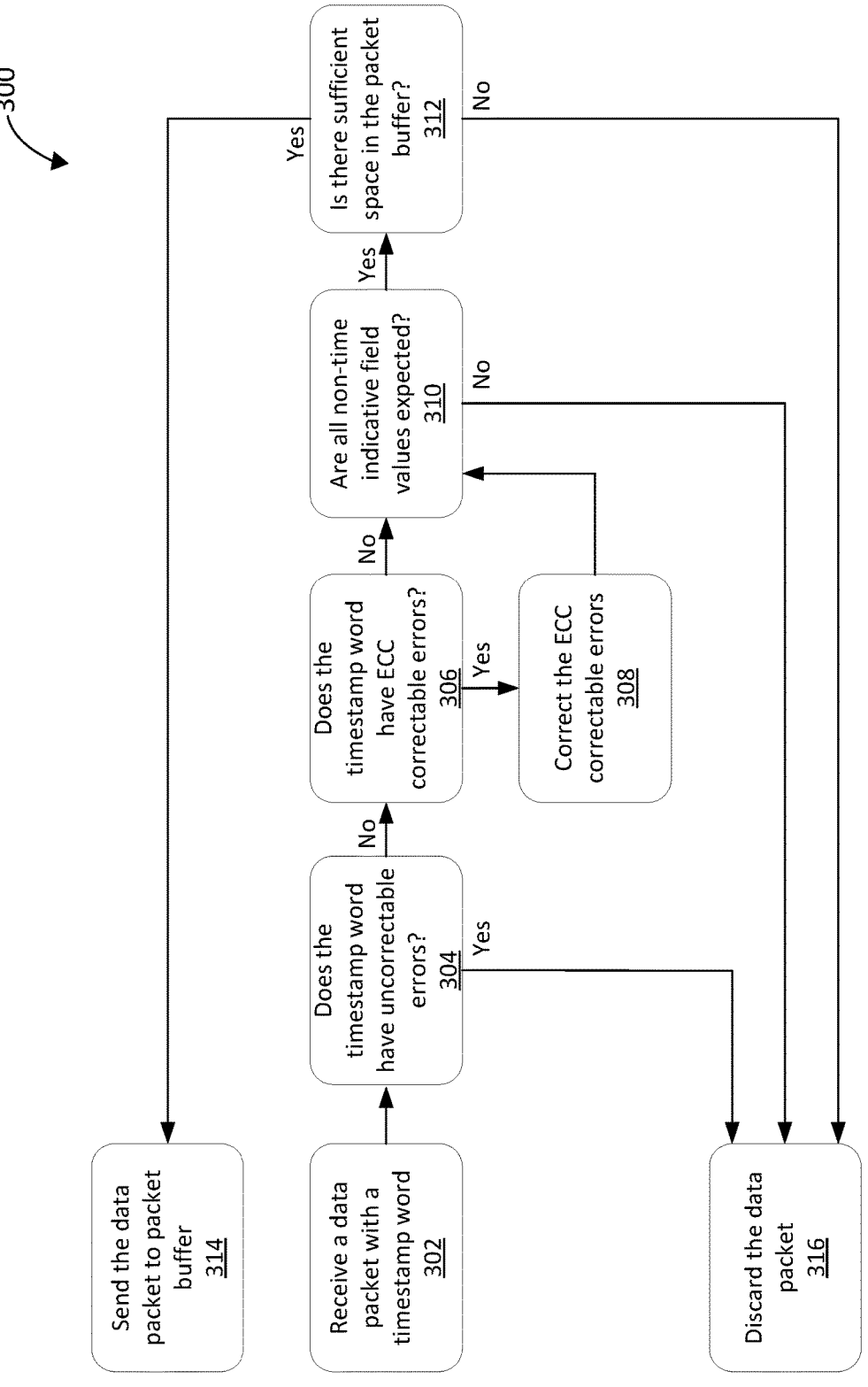
FIG. 3 is a flowchart illustrating validity checks performed after receiving a data packet with a timestamp, according to one embodiment.

FIG. 3 is a flowchart 300 illustrating validity checks after receiving a data packet with a timestamp word, according to one embodiment. In some embodiments, the flowchart 300 may be implemented by the DBF device 104 and the data packet synchronizer 112 as described with respect to FIG. 1. In a first block 302, a data packet with a timestamp word is received. The data packet with the timestamp word may be received by the DBF device 104. In a second block 304, it is determined whether the data packet has uncorrectable errors. If the data packet does not have uncorrectable errors, it is determined whether the data packet has correctable errors at a third block 306. If the data packet has correctable errors, the correctable errors are corrected at a fourth block 308. If the data packet has no errors (e.g., corrected errors or no correctable errors), it is determined whether all non-time indicative field values (e.g., metadata) are expected at a fifth block 310. Non-time indicative field values may include metadata field values, such as a value within a metadata field that indicates a version of the timestamp word. A non-time indicative field is not expected (e.g., unexpected) if the value within the non-time indicative field is not recognized. If all non-time indicative field values are expected, it is determined whether the sending the data packet to a packet buffer (e.g., same or similar to packet buffer 402 of FIG. 4) would cause the packet buffer to overflow (e.g., determine whether sufficient space exists in the packet buffer for the data packet) at a sixth block 312. If it is determined that sending the data packet to the packet buffer would not cause the packet buffer to overflow, the data packet is sent to the packet buffer at a seventh block 314. The data packet is discarded if (i) the data packet contains at least one uncorrectable error, (ii) at least one of the non-time indicative field values of the timestamp word is unexpected, or (iii) sending the data packet to the packet buffer would cause the packet buffer to overflow.

Figure 4:
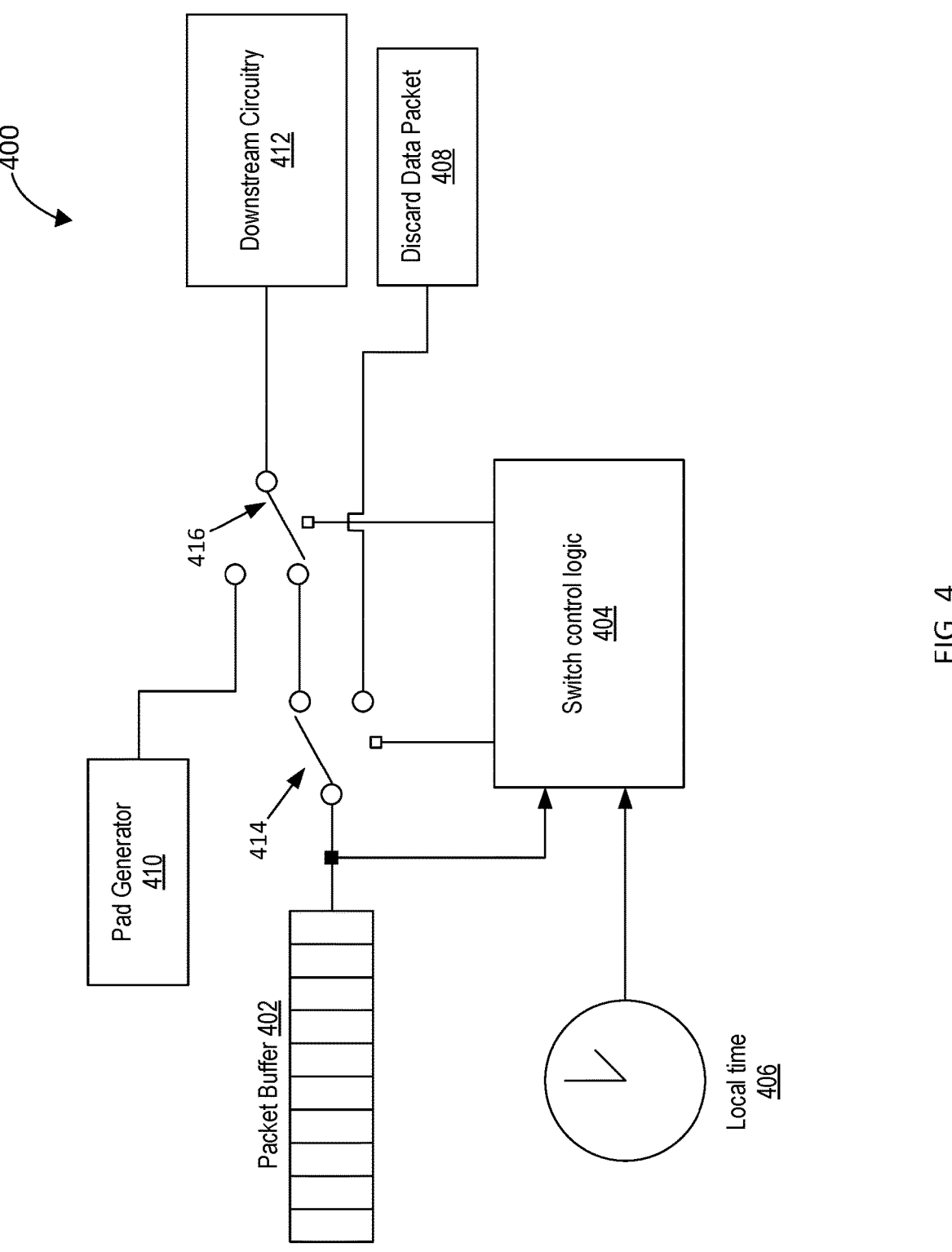
FIG. 4 is a block diagram illustrating timing checks of a transmit (TX) data path within a DBF device, according to one embodiment.

FIG. 4 is a block diagram 400 illustrating timing checks of a TX data path within a DBF device 104, according to one embodiment. In some embodiments, the data packet synchronizer 112 performs timing checks after sending the data packet to a packet buffer 402. The time indicated by the timestamp word and the local time 406 is used by switch control logic 404 to determine (i) whether the data packet should be discarded at block 408 and (ii) whether the data packet should be sent to downstream circuitry 412. As explained above, the local time 406 may be a DSP clock timer local to the DBF device 104. The DSP clock timer may also be local to the data packet synchronizer 112.

In some embodiments, the switch control logic 404 determines whether the data packet should be discarded at block 408 through a first switch 414. Responsive to the first switch 414 being in a first position, the packet buffer may be electrically coupled to a second switch 416. The switch control logic 404 may cause the first switch 414 to be in the first position responsive to the time indicated by the timestamp word being greater than a current time of the local time 406 and less than a cutoff time. The cutoff time, as explained above in reference to FIG. 2, may be related to a length of a packet buffer. Responsive to the first switch 414 being in a second position, the packet buffer may be coupled to block 408, where the data packet is discarded. The block 408 may represent electrical ground (G) or another way to discard the data packet. The switch control logic 404 may cause the first switch 414 to be in the second position responsive to the time indicated by the timestamp word being less than the current time of the local time 406 or greater than the cutoff time.

In at least one embodiment, as explained above, the local time 406 may be a DSP clock timer of modulo $2^{\wedge}32$ and wrap back to zero (0) when the maximum value is reached. As an example (in hexadecimal) of how the switch control logic 404 and the first switch 414 work together, if the current time of the local time 406 is {00000004}, the cutoff time is {00000084}, and the time indicated by the timestamp word is {00000085}, the switch control logic 404 will cause the first switch 414 to be in the second position. However, if the time indicated by the timestamp word is {00000083}, the switch control logic 404 will cause the first switch 414 to be in the first position.

In some embodiments, the switch control logic 404 determines whether the data packet should be sent to downstream circuitry 412 through a second switch 416. Responsive to the second switch 416 being in a third position (and the first switch being in the first position), the packet buffer 402 may be electrically coupled to downstream circuitry, and the data packet is sent from the packet buffer 402 to the downstream circuitry 412. As explained above, the downstream circuitry 412 may be a collection of FEICs 106 and antenna elements 108. The switch control logic 404 may cause the second switch 416 to be in the third position responsive to the time indicated by the timestamp word being equal to (e.g., identical to) the current time of the local time 406. Responsive to the second switch 416 being in a fourth position, the downstream circuitry 412 may be electrically connected to a pad generator 410. The pad generator 410 may provide the downstream circuitry with a data stream of zero (0) bits. The switch control logic 404 may cause the second switch 416 to be in the fourth position responsive to the time indicated by the timestamp word not being equal (e.g., being different) to the current time of the local time 406.

As an exemplary illustration of an embodiment of the block diagram 400, in a first situation, if the current time of the local time 406 is {00000004}, the cutoff time is {00000084}, and the time indicated by the timestamp word is {00000085}, the switch control logic 404 will cause the first switch 414 to be in the second position and the second switch 416 to be in the fourth position. In this first situation, the data packet is discarded by block 408, and the downstream circuitry receives a data stream of zeroes (0s) from the pad generator 410. In a second situation, if the time indicated by the timestamp word is {00000083} while the local time 46 and the cutoff time remain the same as in the first situation, the switch control logic 404 causes the first switch 414 to be in the first position and the second switch 416 to be in the fourth position. In this second situation, the data packet is held within the packet buffer 402 while the downstream circuitry receives a data stream of zeroes (0s).

In a third situation, if the time indicated by the timestamp word is {00000004} while the local time 46 and the cutoff time remain the same as in the first situation, the switch control logic 404 causes the first switch 414 to be in the first position and the second switch 416 to be in the third position. In this third situation, the data packet is sent from the packet buffer 402 to the downstream circuitry 412.

Figure 5:
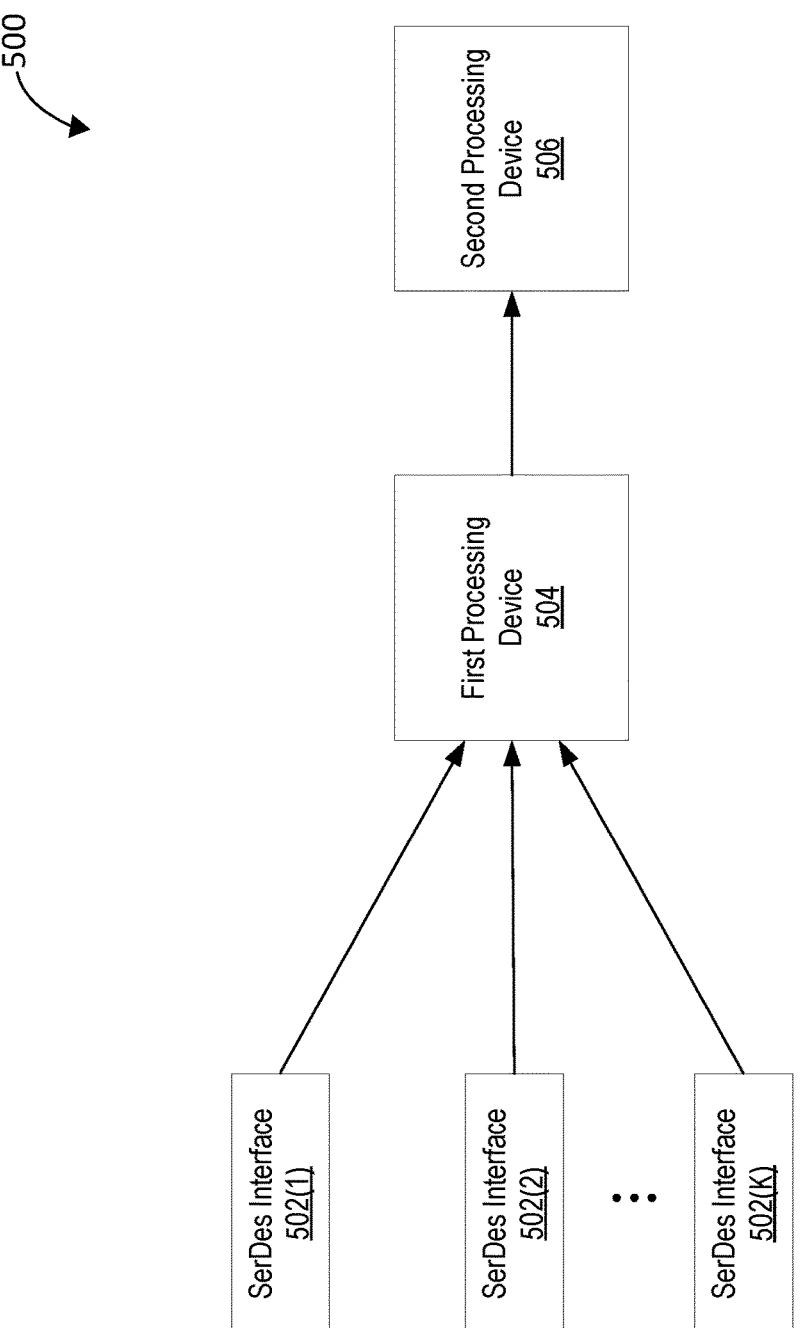
FIG. 5 is a block diagram of a receive (RX) data combining path of a communication subsystem, according to one embodiment.

FIG. 5 is a block diagram 500 of an RX data combining path of a communication subsystem, according to one embodiment. The RX data combining path illustrated in FIG. 5 may occur in several different devices, such as the DBF device 104 or the modem 102. SerDes interfaces 502(1)-(K), where K represents a real integer, are each coupled to a first processing device 504. The first processing device 504 may receive a data packet from each of the SerDes interfaces 502. The first processing device 504 may perform validity checks on each data packet to determine if any data packets were corrupted upon transmission. The uncorrupted data packets are then combined by the first processing device 504 into a single combined data packet. The combined data packet is then sent to a second processing device 506. The combining process is described in detail below.

In some embodiments, the SerDes interfaces 502 and the first processing device 504 are components of a DBF device, such as the DBF device 104(1), and the second processing device 506 is a component of the modem 102, as described in FIG. 1. In these embodiments, to keep the dynamic range of the data packets fixed, the combined data packet may be created through a series of steps. In a first step, the first processing device of the DBF device multiplies each sample of each data packet by a weight equal to a number of DBF devices that have already contributed to the data packet. A downstream DBF device has contributed to a data packet if the data packet was combined (e.g., generated), at a previous time, using data from a local data packet (i.e., a data packet generated and stored in the downstream DBF device). A local data packet comprises data gathered by antenna elements (e.g., antenna elements 108) and directly sent to a DBF device. The local data packet is described in more detail below with respect to FIG. 6. In a second step, the weighted samples of the data packets and a local data packet of the DBF device are aligned (e.g., time-aligned; samples in a first position of each data packet and local data packet are aligned, samples in a second position of each data packet and local data packet are aligned, and so on) and summed (e.g., the aligned samples are added together) to create combined samples of the combined data packet. As a third and final step, the first processing device of the DBF device divides each combined sample by a total number of DBF devices that have contributed to the combined data packet. If the local data packet was aligned and summed together with the data packets received at SerDes interfaces 502(1)-(3) (e.g., as described with respect to FIG. 5), the DBF device comprising the first processing device has also contributed to the combined data packet. By way of example, if each of the data packets received at SerDes interface 502(1)-(3) have five (5) contributing DBF devices, and the local data packet of the DBF device contributed to the combined data packet, the total number of DBF devices that have contributed to the combined data packet is sixteen (16).

In other embodiments, the SerDes interfaces 502 and first processing device 504 are components of the modem 102. In these embodiments, the combining process is similar to the combining process at a DBF device (described above), except the modem does not have a local data packet contributing to the combined data packet. The modem does not have a local data packet because data gathered by antenna elements is not sent directly to a modem. Instead, antenna elements send data gathered directly to a DBF device. For example, using the same example as above, if the first processing device 504 is a component of a modem (i.e., no local data packet), and if each of the data packets received as SerDes interfaces 512(1)-(3) have five (5) contributing DBF devices, the total number of DBF devices that will have contributed to the combined data packet is fifteen (15). In these embodiments, the second processing device 506 may also be a component of the modem 102 that is configured to demodulate the combined data packet.

Figure 6:
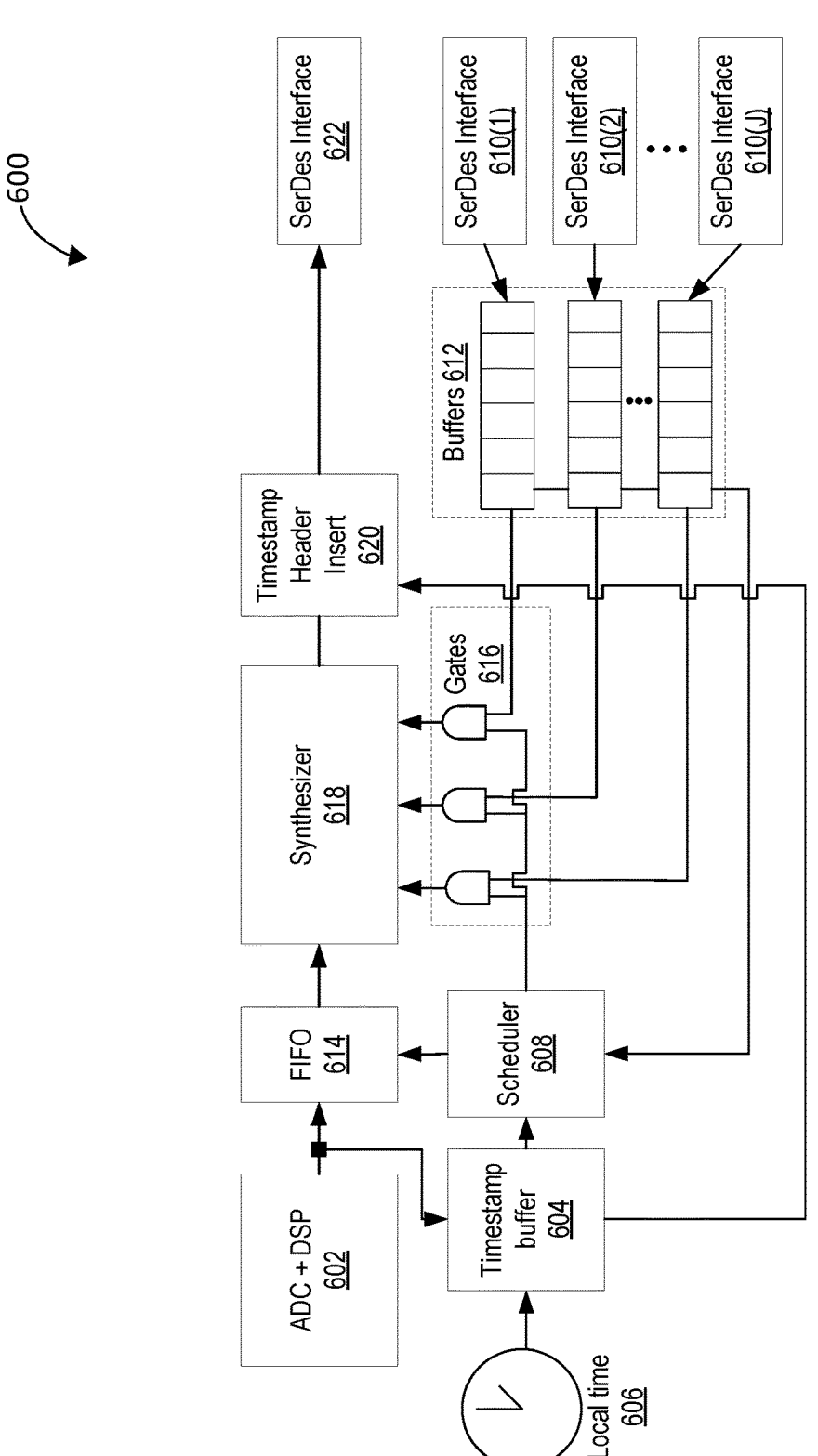
FIG. 6 is a block diagram of an RX data path within a DBF device, according to one embodiment.

FIG. 6 is a block diagram 600 of an RX data path within a DBF device, according to one embodiment. First SerDes interfaces 610(1)-(J), where J represents a real integer, are each coupled to a processing device (e.g., same or similar to the first processing device 504). The processing device may include an analog-to-digital converter (ADC) and a DSP (ADC+DSP), as represented by block 602 (e.g., ADC+DSP 602). The processing device may also include a timestamp buffer 604, a local time 606, a scheduler 608, a first-in-first-out (FIFO) buffer 614 (e.g., a FIFO queue), a synthesizer 618, multiple gates 616, and a timestamp header insert 620. The processing device may be coupled to a second SerDes interface 622.

In some embodiments, first SerDes interfaces 610 each receives a data packet from respective SerDes links. A number of DBF devices 104 may have contributed to each data packet received from the first SerDes interfaces 610. For example, a first number of downstream DBF devices 104 may have contributed to a first data packet received from the first SerDes interface 610(1), while a second number of downstream DBF devices 104 may have contributed to a second data packet received from the first SerDes interface 610(2). In one embodiment, the first number of downstream DBF devices may be communicated to the DBF device via a header appended to the data packet received from a SerDes link. In another embodiment, the first number of downstream DBF devices may be communicated to the DBF device via a separate SerDes connection within the SerDes link connecting the DBF device to a downstream DBF device. A DBF device 104 downstream from a first SerDes interface 610 contributes, to a data packet received at the first SerDes interface 610, by modifying the data packet with local data (i.e., data stored locally on the downstream DBF device 104) before the data packet is received by the first SerDes interface 610. The local data may be IQ data received by the DBF device 104 from the FEIC 106 (i.e., from antenna elements 108) or RFFE circuitry. The local data may be stored as a local data packet comprising the IQ data and a timestamp word. A DBF device 104 modifies the data packet with the local data (e.g., the local data packet) by combining (e.g., aggregating and weighting) at the synthesizer 618 (i) the local data and (ii) the data packets received at the first SerDes interfaces 610, as described below. Each first SerDes interface 610 sends the received data packet to a buffer within the buffers 612. Each of these data packets includes a timestamp word, as described above. The ADC+DSP 602 receives a local data packet from RFFE circuitry coupled to the DBF device (e.g., the same or similar to the DBF device 104). The local data packet includes same or similar features to the data packet as described above with respect to FIGS. 1-4, such as including a timestamp word. The local data packet may include the local data as described above. The DBF device, upon receiving data packets from either the first SerDes interfaces 610 or the ADC+DSP 602, performs one or more of the validity checks on the local data packet that are described above in reference to FIGS. 2 and 3. Additionally, the DBF device may check the arrival time of the local data packet relative to a local packet generation schedule. The local packet generation schedule may include intervals between data packets and a fixed time for the first local data packet received, such that all subsequent packet times can be calculated by adding the correct multiple of the interval to the first packet time.

The scheduler 608 may be configured to pass a group of data packets from the buffers 612 to the synthesizer 618. The data packets may pass when they have matching (e.g., identical, expected) times indicated by respective timestamp words. A timestamp word may be expected if the timestamp word matches the timestamp word of the local data packet or other data packets received at the first SerDes interfaces 610. Responsive to a group of data packets having matching timestamp words, the scheduler 608 sends a signal to the gates 616 that allows the data packets stored in the buffers 612 to be sent to the synthesizer 618.

The local data packet received by the ADC+DSP 602 may be sent to the FIFO 614, which in turn sends the local data packet to the synthesizer 618. The timestamp buffer 604 may remove and store the timestamp word of the local data packet. Typically, the timestamp of the local time packet will match the timestamp words of the data packets received at the first SerDes interfaces 610. The synthesizer then combines the local data packet and the data packets received at the first SerDes interfaces 610 to generate a combined data packet. The timestamp words of the local data packet and the data packets received at the first SerDes interfaces 610 may be removed (e.g., excluded) before the synthesizer 618 generates the combined data packet. The combined data packet may be generated as described above with respect to FIG. 5. In some embodiments, the synthesizer 618 excludes the timestamp words. In other embodiments, the timestamp words are removed from each data packet before each data packet reaches the synthesizer 618. The timestamp header insert then modifies the combined data packet with a new timestamp. In some embodiments, the new timestamp may indicate a time that a first sample of the data packet was received by the DBF device 104. The new timestamp may be based on the timestamp word of the local data packet that the timestamp buffer 604 removed and stored. Once the combined data packet has been modified with the new timestamp, the combined data packet is sent to the second SerDes interface.

It should be noted that while the block diagram 600 illustrates an RX data path within a DBF device, the block diagram may also be similar to an RX data path within a modem (e.g., modem 102). Within the modem, each element of the block diagram 600 is the same except for the ADC+DSP 602 and the SerDes interface 622. The ADC+DSP 602 is a pad generator similar to the pad generator 410 of FIG. 4. Thus, unlike a DBF device 104, because the modem does not have an ADC+DSP 602, the modem does not store a local data packet. The SerDes interface 622 may still be a SerDes interface, but may be any generic interface to a different processing device (e.g., a host device). In this embodiment, the synthesizer 618 combines only the data packets from the buffers 612 before sending the combined data packet to the SerDes interface 622. In some embodiments, the pad generator may be combined with the data packets from the buffers 612. The combined data packet may then be sent to the different processing device where the combined data packet is demodulated. In at least one embodiment, the different processing device demodulates the combined data packet upon receiving the combined data packet from the SerDes interface 622.

It should also be noted that, for both TX and RX embodiments described above, the present disclosure provides the same solution for communication subsystems utilizing store-and-forward mode buffers or cut-through mode buffers.

Figures 7A, 7B:
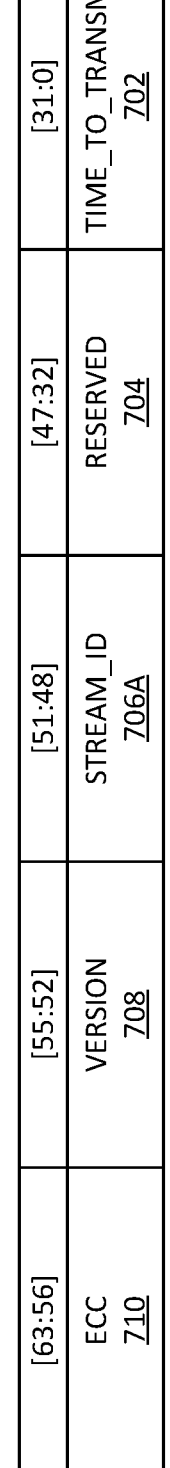
FIG. 7A is a header for a data packet on a TX data path, according to one embodiment.
FIG. 7B is a header for a data packet on a RX data path, according to one embodiment.

FIG. 7A is a header 700A for a data packet on a TX data path, according to one embodiment. In one embodiment, the header 700A may be the same or similar to the timestamp word as described above with respect to FIG. 1. In another embodiment, the header 700A may include many of the same features as the timestamp word as described above with respect to FIG. 1. The header 700A may be a string of 64 bits. The header 700A may include several metadata fields such as a TIME_TO_TRANSMIT field 702, a RESERVED field 704, a STREAM_ID field 706A, a VERSION field 708, and an ECC field 710. Each of these fields may have a predetermined length, such as the TIME_TO_TRANSMIT field 702 having a length of 32 bits. Each of these predetermined lengths of fields may be variable and subject to change.

The TIME_TO_TRANSMIT field 702 may be equivalent to the time indicated by the timestamp word as described above with respect to FIG. 1. The TIME_TO_TRANSMIT field 702 may represent an exact value of the DSP clock timer on which to transmit the first sample of data contained within a data packet.

The RESERVED field 704 may be a space reserved in the header for future format changes. In some embodiments, the values within the RESERVED field 704 must be set to zero (0). The STREAM_ID field 706A may indicate which modem (or modem group) originated data (e.g., IQ data) within the data packet. The VERSION field 708 may indicate a version of header or data packet. The ECC field 710 may be an eight (8) parity bits of a shortened Hamming code calculated over the complete header (e.g., calculated over bits [55:0] of the header). The ECC field 710 may function as described above with respect to FIG. 1.

FIG. 7B is a header 700B for a data packet on a RX data path, according to one embodiment. In one embodiment, the header 700B may be the same or similar to the timestamp word as described above with respect to FIG. 1. In another embodiment, the header 700B may include many of the same features as the timestamp word as described above with respect to FIG. 1. The header 700B may also have many similar features as the header 700A discussed above. The header 700B may be a string of 64 bits. The header 700A may include several metadata fields such as a TIME_OF_RECEIPT field 712, a RESERVED field 704, a STRE-AM_ID field 706B, a VERSION field 708, an ECC field 710, and a mode field 714. Each of these fields may have a predetermined length, such as the TIME_OF_RECEIPT field 712 having a length of 32 bits. Each of these predetermined lengths of fields may be variable and subject to change.

The TIME_OF_RECEIPT field 712 may be equivalent to the time indicated by the new timestamp as described with respect to FIG. 6. The TIME_OF_RECEIPT field 712 may represent an exact value of the DSP clock timer on which a first sample data of the data packet was received by a DBF device 104. The STREAM_ID field 706B may indicate from which data routing path (e.g., which SerDes interface 610) the data packet originated. The MODE field 714 indicating a packing mode (e.g, a packet packing mode) corresponding to the data packet.

Figure 8:
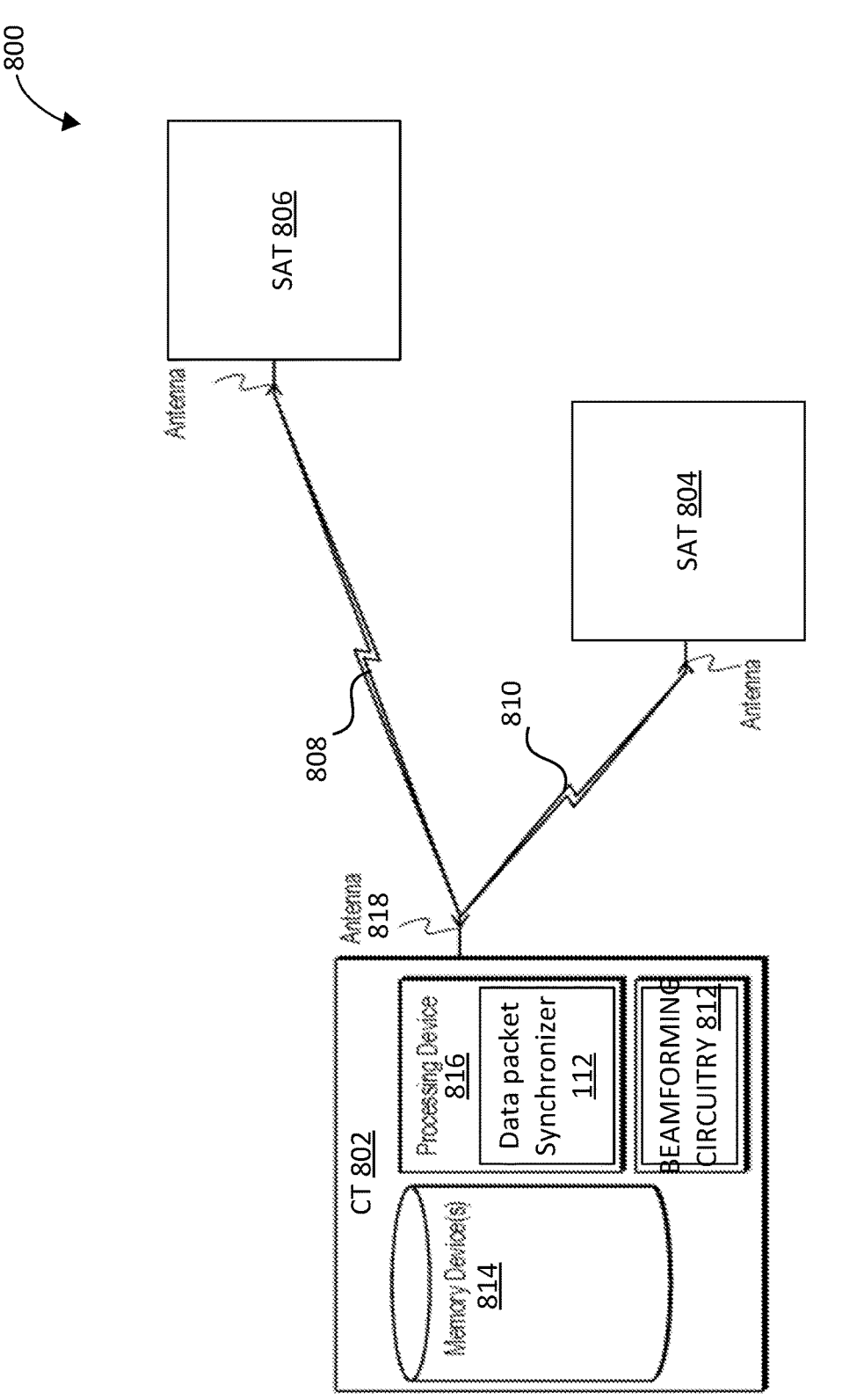
FIG. 8 is a block diagram of a satellite network including a CT with a phased array antenna with in-field calibration antennas outage according to at least one embodiment.

FIG. 8 is a block diagram of a satellite network 800 including a customer terminal (CT) 802 with a phased array antenna 818 with in-field calibration antennas according to at least one embodiment. The satellite network 800 can include multiple communication devices, including communication devices in CTs, SATs, etc. The CT 802 can be the UT 908 described below with respect to FIG. 9. The SAT 804 can be any one of the SAT 902*a*, 902*b*, . . . , etc., of FIG. 9. The communication devices in the satellite network 800 can receive position, navigation, and timing (PNT) information from an SAT 806. The processing device 816 can establish a communication link 810 with the SAT 804 and a communication link 808 with SAT 806. The SAT 804 and SAT 806 can be artificial satellites and may include one or more satellite communication elements (e.g., discussed further in FIG. 9 to FIG. 12). The SAT 804 can be considered an anchor SAT that provides PNT information.

In at least one embodiment, the CT 802 includes one or more processing devices 816 that implement the data packet synchronizer 112, beamforming circuitry 812, and one or more memory device(s) 814. The processing device 816 can be or include one or more CPUs, microcontrollers, field programmable gate arrays, or other types of processors. The beamforming circuitry 812 can be coupled to one or more antennas, such as a phased array antenna 818, to communicate with other devices. The CT 802 can include other circuitry for communicating wirelessly. For example, the CT 802 can include one or more RF chains. The RF chains can have low-noise amplifiers (LNAs), automatic gain controllers (AGCs), analog-to-digital converters (ADCs), digital beamforming (DBF) devices, etc., to transmit signals and/or process received signals (e.g., directs analog and digital beamforming components, converts the signal to a digital representation, and processing the digital information) to produce digital samples of the received signal. In some embodiments, instead of two or more antennas, a single antenna with multiple apertures may be used. The RF chain(s) can be configured to directly receive beams to receive signals at various beamforming angles. Receive beams may be directed using a weighting pattern across beamforming elements and an antenna array. The weighting pattern may result in a sensitivity pattern due to signal interference. An antenna gain pattern may include a weighting pattern (or distribution of signal processing weights) that may include a combination of beamforming values, such as phase shifting values, signal amplifier values, etc., that are configured to steer a signal (e.g., main lobe, side lobes, signal minimum points, etc.) to orient at different directions. An antenna gain pattern may include a main lobe, side lobes, and signal minimums spread across various directions relative to a bearing angle of an antenna array. In some embodiment, a bearing angle is defined as a direction normal to a plane of an antenna array (or, more generally, a portion and an array antenna). Further details regarding beamforming and beam steering are discussed in FIG. 12.

In at least one embodiment, the CT 802 includes at least one data packet synchronizer 112 that synchronizes signals transmitted from each antenna element in phased array antenna 818, as described above. The CT 802 may include multiple data packet synchronizers that each synchronize a portion of the phased array antenna 818.

Although devices of the satellite network 800 are illustrated as having several separate functional elements, one or more of the functional elements may be combined and may be implemented by combinations of software-configured elements, such as processing elements, including digital signal processors (DSPs), and/or other hardware elements.

For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of a device may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 9:
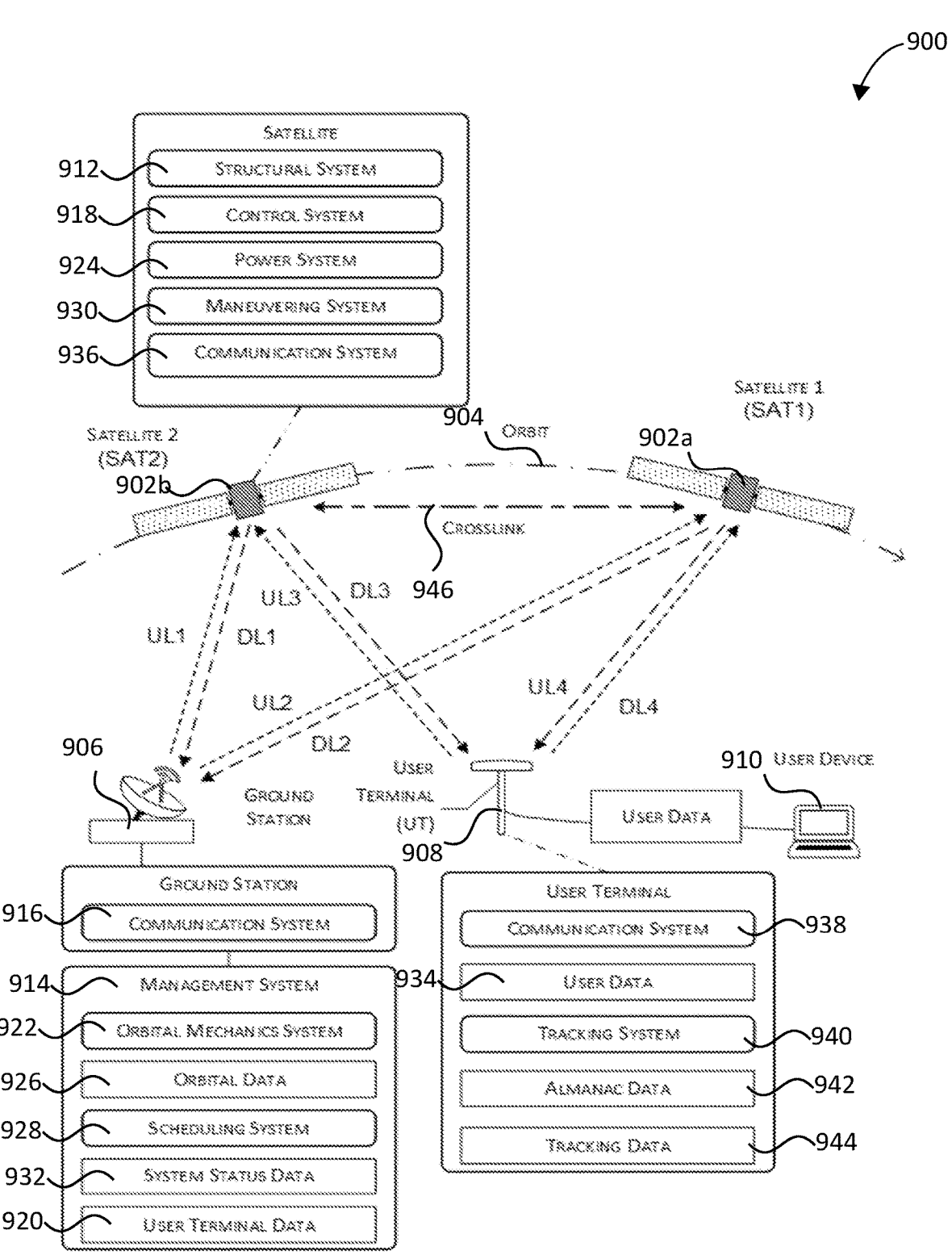
FIG. 9 illustrates a portion of a communication system that includes two satellites of a constellation of satellites, each satellite being in orbit, according to embodiments of the present disclosure.

FIG. 9 illustrates a portion of a communication system 900 that includes two satellites of a constellation of satellites 902*a*, 902*b*, . . . , etc., each satellite 902 being in orbit 904 according to embodiments of the present disclosure. The system 900 shown here comprises a plurality (or "constellation") of satellites 902*a*, 902*b*, . . . , etc., each satellite 902 being in orbit 904 as part of a satellite network, such as satellite network 800 of FIG. 8. Also shown is a ground station 906, a user terminal (UT) 908 (also referred to herein as customer terminal (CT)), and a user device 910.

The constellation may comprise hundreds or thousands of satellites 902, in various orbits 904. For example, one or more of these satellites 902 may be in non-geosynchronous orbits (NGOs) in which they are in constant motion with respect to the Earth. For example, the orbit 904 is a low earth orbit (LEO). In this illustration, orbit 904 is depicted with an arc pointed to the right. A first satellite (SAT1) 902*a* is leading (ahead of) a second satellite (SAT2) 902*b* in the orbit 904.

The satellite 902 may comprise a structural system 912, a control system 918, a power system 924, a maneuvering system 930, and a communication system 936. In other implementations, some systems may be omitted or other systems added. One or more of these systems may be communicatively coupled with one another in various combinations.

The structural system 912 comprises one or more structural elements to support the operation of the satellite 902. For example, the structural system 912 may include trusses, struts, panels, and so forth. The components of other systems may be affixed to or housed by the structural system 912. For example, the structural system 912 may provide mechanical mounting and support for solar panels in the power system 924. The structural system 912 may also provide thermal control to maintain components of the satellite 902 within operational temperature ranges. For example, the structural system 912 may include louvers, heat sinks, radiators, and so forth.

The control system 918 provides various services, such as operating the onboard systems, resource management, providing telemetry, processing commands, and so forth. For example, the control system 918 may direct the operation of the communication system 936.

The power system 924 provides electrical power to operate the components onboard the satellite 902. The power system 924 may include components to generate electrical energy. For example, the power system 924 may comprise one or more photovoltaic cells, thermoelectric devices, fuel cells, and so forth. The power system 924 may include components to store electrical energy. For example, the power system 924 may comprise one or more batteries, fuel cells, and so forth.

The maneuvering system 930 maintains the satellite 902 in one or more specified orientations or orbit 904. For example, the maneuvering system 930 may stabilize the satellite 902 with respect to one or more axes. In another example, the maneuvering system 930 may move the satellite 902 to a specified orbit 904. The maneuvering system 930 may include one or more computing devices, sensors, thrusters, momentum wheels, solar sails, drag devices, and so forth. For example, the sensors of the maneuvering system 930 may include one or more global navigation satellite system (GNSS) receivers, such as global positioning system (GPS) receivers, to provide information about the position and orientation of the satellite 902 relative to Earth. In another example, the sensors of the maneuvering system 930 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 936 provides communication with one or more other devices, such as other satellites 902, ground stations 906, user terminals 908, and so forth. The communication system 936 may include one or more modems, digital signal processors, power amplifiers, antennas (including at least one antenna that implements multiple antenna elements, such as a phased array antenna and an embedded calibration antenna), processors, memories, storage devices, communications peripherals, interface buses, and so forth. Such components support communications with other satellites 902, ground stations 906, user terminals 908, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 936 may be output to other systems, such as the control system 918, for further processing. Output from a system, such as the control system 918, may be provided to the communication system 936 for transmission.

One or more ground stations 906 are in communication with one or more satellites 902. The ground stations 906 may pass data between the satellites 902, a management system 914, networks such as the Internet, and so forth. The ground stations 906 may be emplaced on land, on vehicles, at sea, and so forth. Each ground station 906 may comprise a communication system 916. The aspects and embodiments of the present disclosure with respect to FIGS. 1-6 may occur within one or more of the communication system 916 of the ground station 906 and the satellite 902. Each ground station 906 may use the communication system 916 to establish communication with one or more satellites 902, other ground stations 906, and so forth. The ground station 906 may also be connected to one or more communication networks. For example, the ground station 906 may connect to a terrestrial fiber optic communication network. The ground station 906 may act as a network gateway, passing user data 934 or other data between the one or more communication networks and the satellites 902. Such data may be processed by the ground station 906 and communicated via the communication system 916. The communication system 916 of a ground station may include components similar to those of the communication system 936 of a satellite 902 and may perform similar communication functionalities. For example, the communication system 916 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 906 are in communication with a management system 914. The management system 914 is also in communication, via the ground stations 906, with the satellites 902 and the UTs 908. The management system 914 coordinates the operation of the satellites 902, ground stations 906, UTs 908, and other resources of the communication system 900. The management system 914 may comprise one or more of an orbital mechanics system 922 or a scheduling system 928. In some embodiments, the scheduling system 928 can operate in conjunction with an HD controller.

The orbital mechanics system 922 determines orbital data 926 that is indicative of a state of a particular satellite 902 at a specified time. In one implementation, the orbital mechanics system 922 may use orbital elements that represent characteristics of the orbit 904 of the satellites 902 in the constellation to determine the orbital data 926 that predicts location, velocity, and so forth of particular satellites 902 at particular times or time intervals. For example, the orbital mechanics system 922 may use data obtained from actual observations from tracking stations, data from the satellites 902, scheduled maneuvers, and so forth to determine the orbital elements. The orbital mechanics system 922 may also consider other data, such as space weather, collision mitigation, orbital elements of known debris, and so forth.

The scheduling system 928 schedules resources to provide communication to the UTs 908. For example, the scheduling system 928 may determine handover data that indicates when communication is to be transferred from the first satellite 902a to the second satellite 902b. Continuing the example, the scheduling system 928 may also specify communication parameters such as frequency, timeslot, and so forth. During operation, the scheduling system 928 may use information such as the orbital data 926, system status data 932, user terminal data 920, and so forth.

The system status data 932 may comprise information such as which UTs 908 are currently transferring data, satellite availability, current satellites 902 in use by respective UTs 908, capacity available at particular ground stations 906, and so forth. For example, the satellite availability may comprise information indicative of satellites 902 that are available to provide communication service or those satellites 902 that are unavailable for communication service. Continuing the example, a satellite 902 may be unavailable due to malfunction, previous tasking, maneuvering, and so forth. The system status data 932 may be indicative of past status, predictions of future status, and so forth. For example, the system status data 932 may include information such as projected data traffic for a specified interval of time based on previous transfers of user data 934. In another example, the system status data 932 may be indicative of future statuses, such as a satellite 902 being unavailable to provide communication service due to scheduled maneuvering, scheduled maintenance, scheduled decommissioning, and so forth.

The user terminal data 920 may comprise information such as a location of a particular UT 908. The user terminal data 920 may also include other information, such as a priority assigned to user data 934 associated with that UT 908, information about the communication capabilities of that particular UT 908, and so forth. For example, a particular UT 908 in use by a business may be assigned a higher priority relative to a UT 908 operated in a residential setting. Over time, different versions of UTs 908 may be deployed, having different communication capabilities, such as being able to operate at particular frequencies, supporting different signal encoding schemes, having different antenna configurations, and so forth.

The UT 908 includes a communication system 938 to establish communication with one or more satellites 902. The communication system 938 of the UT 908 may include components similar to those of the communication system 936 of a satellite 902 and may perform similar communication functionalities. For example, the communication system 938 may include one or more modems, digital signal processors, power amplifiers, antennas (including at least one antenna that implements multiple antenna elements, such as a phased array antenna), processors, memories, storage devices, communications peripherals, interface buses, and so forth. The UT 908 passes user data 934 between the constellation of satellites 902 and the user device 910. The user data 934 includes data originated by the user device 910 or addressed to the user device 910. The UT 908 may be fixed or in motion. For example, the UT 908 may be used at a residence or on a vehicle such as a car, boat, aerostat, drone, airplane, and so forth.

The UT 908 includes a tracking system 940. The tracking system 940 uses almanac data 942 to determine tracking data 944. The almanac data 942 provides information indicative of orbital elements of the orbit 904 of one or more satellites 902. For example, the almanac data 942 may comprise orbital elements such as "two-line element" data for the satellites 902 in the constellation that are broadcast or otherwise sent to the UTs 908 using the communication system 938.

The tracking system 940 may use the current location of the UT 908 and the almanac data 942 to determine the tracking data 944 for the satellite 902. For example, based on the current location of the UT 908 and the predicted position and movement of the satellites 902, the tracking system 940 can calculate the tracking data 944. The tracking data 944 may include information indicative of azimuth, elevation, distance to the second satellite, time of flight correction, or other information at a specified time. The determination of the tracking data 944 may be ongoing. For example, the first UT 908 may determine tracking data 944 every 1000 ms, every second, every five seconds, or at other intervals.

With regard to FIG. 9, an uplink is a communication link that allows data to be sent to a satellite 902 from a ground station 906, UT 908, or a device other than another satellite 902. Uplinks are designated as UL1, UL2, UL3, and so forth. For example, UL1 is a first uplink from the ground station 906 to the second satellite 902b. In comparison, a downlink is a communication link that allows data to be sent from the satellite 902 to a ground station 906, UT 908, or a device other than another satellite 902. For example, UL1 is a first downlink from the second satellite 902b to the ground station 906. The satellites 902 may also be in communication with one another. For example, a crosslink 946 provides for communication between satellites 902 in the constellation.

The satellite 902, the ground station 906, the user terminal 908, the user device 910, the management system 914, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions by using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

Figure 10:
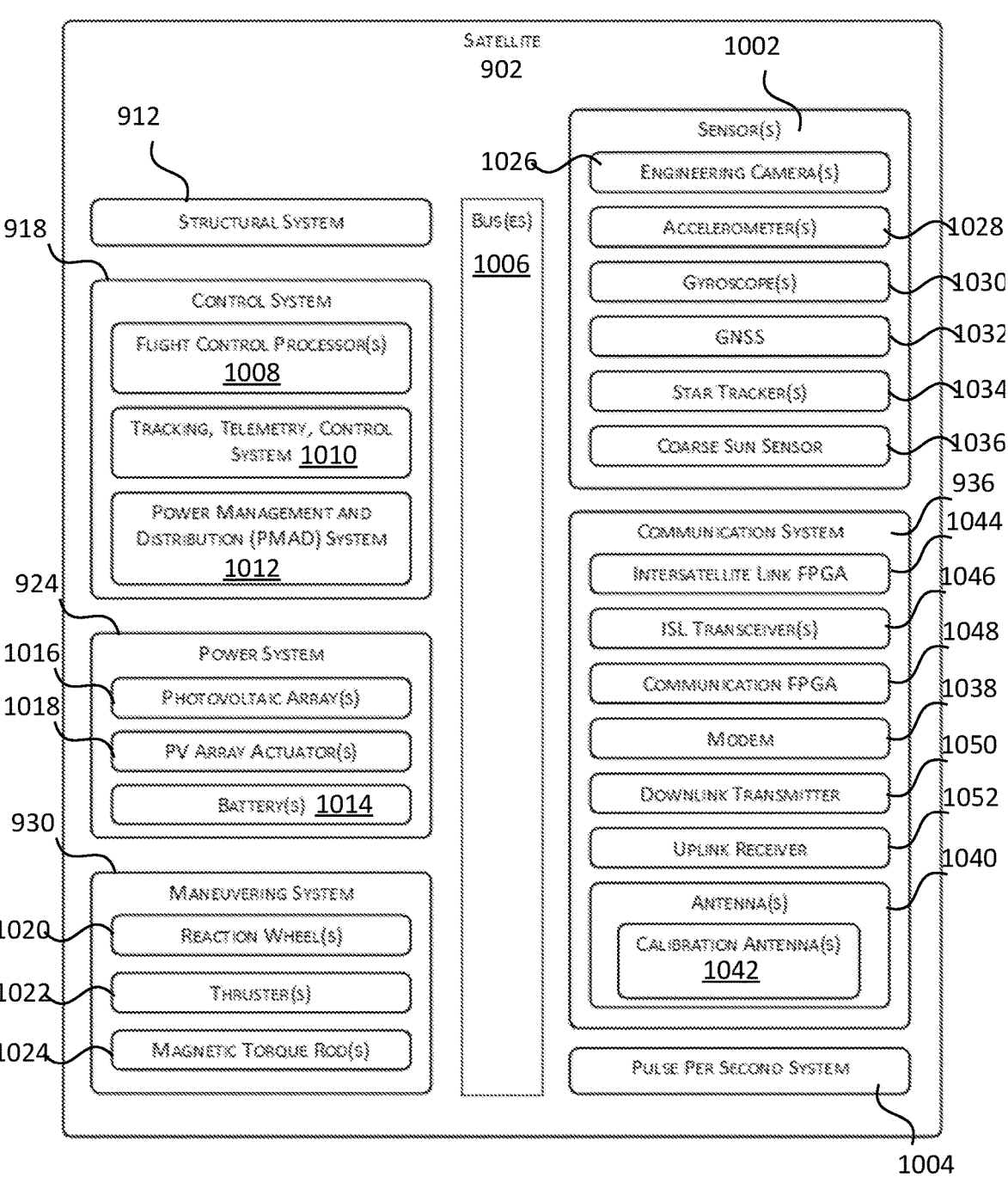
FIG. 10 is a functional block diagram of some systems associated with the satellite, according to some implementations.

FIG. 10 is a functional block diagram of some systems associated with the satellite 902, according to some implementations. The satellite 902 may comprise a structural system 912, a control system 918, a power system 924, a maneuvering system 930, one or more sensor(s) 1002, and a communication system 936. A pulse per second (PPS) system 1004 may be used to provide a timing reference to the systems onboard the satellite 902. One or more bus(es) 1006 may be used to transfer data between the systems onboard the satellite 902. In some implementations, redundant busses may be provided. The bus(es) 1006 may include, but are not limited to, data busses such as Controller Area Network Flexible Data Rate (CAN FD), Ethernet, Serial Peripheral Interface (SPI), and so forth. In some implementations, the bus(es) 1006 may carry other signals. For example, a radio frequency bus may comprise a coaxial cable, waveguides, and so forth to transfer radio signals from one part of the satellite 902 to another. In other implementations, some systems may be omitted, or other systems added. One or more of these systems may be communicatively coupled with one another in various combinations.

The structural system 912 comprises one or more structural elements to support the operation of the satellite 902. For example, the structural system 912 may include trusses, struts, panels, and so forth. The components of other systems may be affixed to or housed by the structural system 912. For example, the structural system 912 may provide mechanical mounting and support for solar panels in the power system 924. The structural system 912 may also provide for thermal control to maintain components of the satellite 902 within operational temperature ranges. For example, the structural system 912 may include louvers, heat sinks, radiators, and so forth.

The control system 918 provides various services, such as operating the onboard systems, resource management, providing telemetry, processing commands, and so forth. For example, the control system 918 may direct the operation of the communication system 936. The control system 918 may include one or more flight control processors 1008. The flight control processors 1008 may comprise one or more processors, FPGAs, and so forth. A tracking, telemetry, and control (TTC) system 1010 may include one or more processors, radios, and so forth. For example, the TTC system 1010 may comprise a dedicated radio transmitter and receiver to receive commands from a ground station 906, send telemetry to the ground station 906, and so forth. A power management and distribution (PMAD) system 1012 may direct the operation of the power system 924, control distribution of power to the systems of the satellite 902, control battery 1014 charging, and so forth.

The power system 924 provides electrical power to operate the components onboard the satellite 902. The power system 924 may include components to generate electrical energy. For example, the power system 924 may comprise one or more photovoltaic (PV) arrays 1016 comprising a plurality of photovoltaic cells, thermoelectric devices, fuel cells, and so forth. One or more PV array actuators 1018 may be used to change the orientation of the photovoltaic array(s) 1016 relative to the satellite 902. For example, the PV array actuator 1018 may comprise a motor. The power system 924 may include components to store electrical energy. For example, the power system 924 may comprise one or more batteries 1014, fuel cells, and so forth.

The maneuvering system 930 maintains the satellite 902 in one or more specified orientations or orbit 904. For example, the maneuvering system 930 may stabilize the satellite 902 with respect to one or more axes. In another example, the maneuvering system 930 may move the satellite 902 to a specified orbit 904. The maneuvering system 930 may include one or more of reaction wheel(s) 1020, thrusters 1022, magnetic torque rods 1024, solar sails, drag devices, and so forth. The thrusters 1022 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellent, using electrical power obtained from the power system 924 to expel the water and produce thrust. During operation, the maneuvering system 930 may use data obtained from one or more of the sensor(s) 1002.

The satellite 902 includes one or more sensor(s) 1002. The sensor(s) 1002 may include one or more engineering camera(s) 1026. For example, an engineering camera 1026 may be mounted on the satellite 902 to provide images of at least a portion of the photovoltaic PV array 1016. Accelerometer(s) 1028 provide information about the acceleration of the satellite 902 along one or more axes. Gyroscope(s) 1030 provide information about the rotation of the satellite 902 with respect to one or more axes. The sensor(s) 1002 may include a global navigation satellite system (GNSS) receiver 1032, such as a Global Positioning System (GPS) receiver, to provide information about the position of the satellite 902 relative to Earth. In some implementations, the GNSS 1032 may also provide information indicative of velocity, orientation, and so forth. One or more star tracker(s) 1034 may be used to determine an orientation of the satellite 902. A coarse sun sensor 1036 may be used to detect the sun, provide information on the relative position of the sun with respect to the satellite 902, and so forth. The satellite 902 may include other sensor(s) 1002 as well. For example, the satellite 902 may include a horizon detector, radar, lidar, and so forth.

The communication system 936 provides communication with one or more other devices, such as other satellites 902, ground stations 906, user terminals 908, and so forth. The communication system 936 may include one or more modems 1038, digital signal processors, power amplifiers, antennas 1040 (including a calibration antenna 1042), such as a phased array antenna), processors, memories, storage devices, communications peripherals, interface buses, and so forth. Such components support communications with other satellites 902, ground stations 906, user terminals 908, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 936 may be output to other systems, such as the control system 918, for further processing. Output from a system, such as the control system 918, may be provided to the communication system 936 for transmission.

The communication system 936 may include hardware to support the crosslink 946 (e.g., intersatellite (ISL) link). For example, an intersatellite link FPGA 1044 may be used to modulate data sent and received by one or more ISL transceiver(s) 1046 to send data between satellites 902. The ISL transceiver(s) 1046 may operate using radio frequencies, optical frequencies, and so forth.

A communication FPGA 1048 may be used to facilitate communication between the satellite 902 and the ground stations 906, UTs 908, and so forth. For example, the communication FPGA 1048 may direct the operation of a modem 1038 to modulate signals sent using a downlink transmitter 1050 and demodulate signals received using an uplink receiver 1052. In some embodiments, modem 1038 and modem 102 as described with respect to FIG. 1 are the same. The satellite 902 may include one or more antennas 1040. For example, one or more parabolic antennas may be used to provide communication between the satellite 902 and one or more ground stations 906. In another example, a phased array antenna may be used to provide communication between the satellite 902 and the UTs 908.

Figure 11:
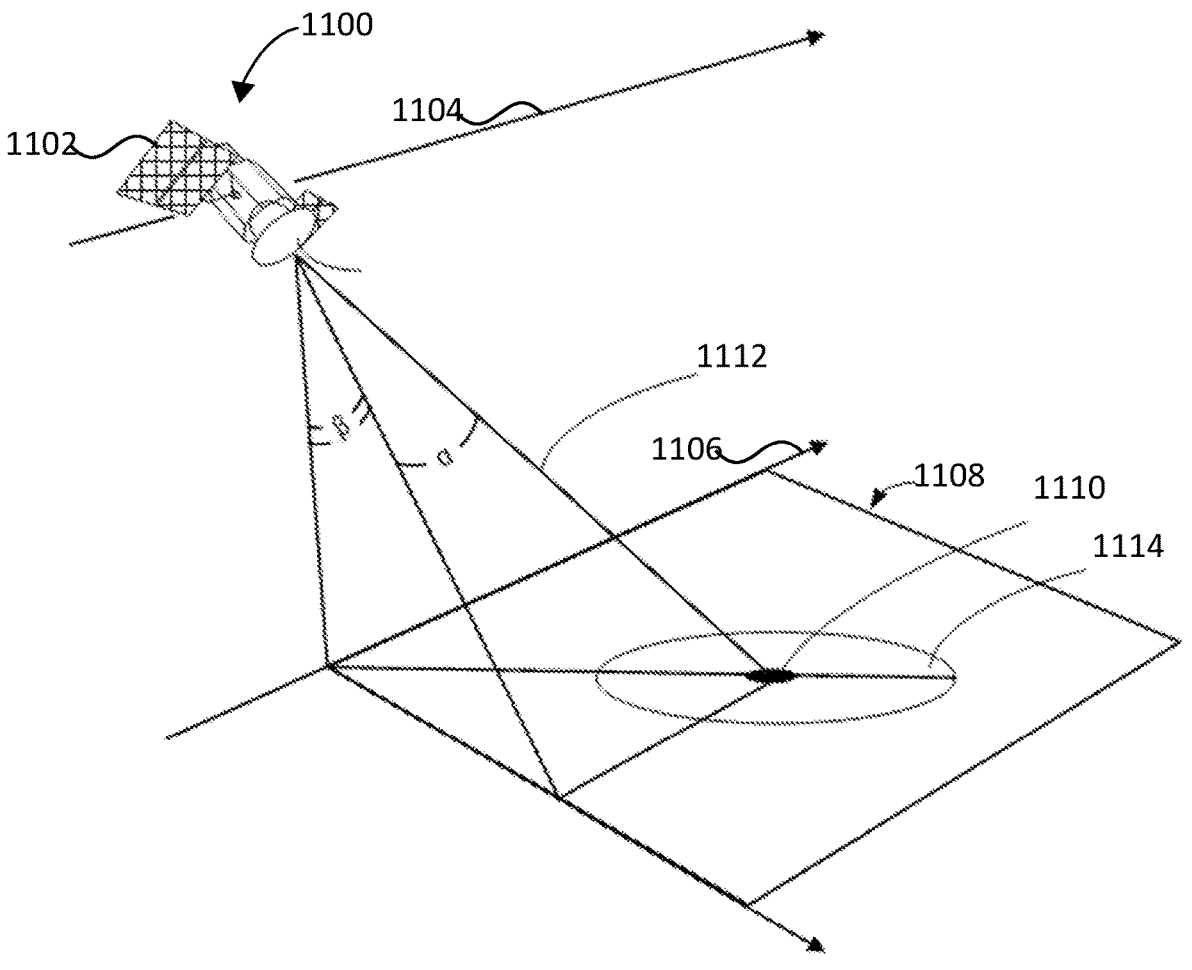
FIG. 11 illustrates a satellite including an antenna system that is steerable, according to embodiments of the present disclosure.

FIG. 11 illustrates the satellite 1100 including an antenna system 1202 that is steerable according to embodiments of the present disclosure. The satellite 1100 can be the SAT 902 of the satellite network 800 of FIG. 8. The antenna system 1102 may include multiple antenna elements that form an antenna and can be mechanically or electrically steered individually, collectively, or a combination thereof. In an example, the antenna is a phased array antenna.

In orbit 904, the satellite 1100 follows a path 1104, the projection of which onto the surface of the Earth forms a ground path 1106. In the example illustrated in FIG. 11, the ground path 1106 and a projected axis extending orthogonally from the ground path 1106 at the position of the satellite 1100, together define a region 1108 of the surface of the Earth. In this example, the satellite 1100 can establish uplink and downlink communications with one or more of ground stations, user terminals, or other devices within the region 1108. In some embodiments, the region 1108 may be located in a different relative position to the ground path 1106 and the position of the satellite 1100. For example, the region 1108 may describe a region of the surface of the Earth directly below the satellite 1100. Furthermore, embodiments may include communications between the satellite 1100, an airborne communications system, and so forth.

As shown in FIG. 11, a communication target 1110 (e.g., a ground station, a user terminal, or a CT (such as an HD CT)) is located within the region 1108. The satellite 1100 controls the antenna system 1102 to steer transmission and reception of communications signals to selectively communicate with the communication target 1110. For example, in a downlink transmission from the satellite 1100 to the communication target 1110, a signal beam 1112 emitted by the antenna system 1102 is steerable within an area 1114 of the region 1108. In some implementations, the signal beam 1112 may include multiple subbeams. The extents of the area 1114 define an angular range within which the signal beam 1112 is steerable, where the direction of the signal beam 1112 is described by a beam angle "α" relative to a surface normal vector of the antenna system 1102. In two-dimensional phased array antennas, the signal beam 1112 is steerable in two dimensions, described in 15 by a second angle "β" orthogonal to the beam angle α. In this way, the area 1114 is a two-dimensional area within the region 1108, rather than a linear track at a fixed angle determined by the orientation of the antenna system 1102 relative to the ground path 1106.

In FIG. 11, as the satellite 1100 follows the path 1104, the area 1114 tracks along the surface of the Earth. In this way, the communication target 1110, which is shown centered in the area 1114 for clarity, is within the angular range of the antenna system 1102 for a period of time. During that time, signals communicated between the satellite 1100 and the communication target 1110 are subject to bandwidth constraints, including but not limited to signal strength and calibration of the signal beam 1112. In an example, for phased array antenna systems, the signal beam 1112 is generated by an array of mutually coupled antenna elements, wherein constructive and destructive interferences produce a directional beam. Among other factors, phase drift, amplitude drift (e.g., of a transmitted signal in a transmitter array), and so forth affect the interference properties and, thus, the resultant directional beam or subbeam.

Figure 12:
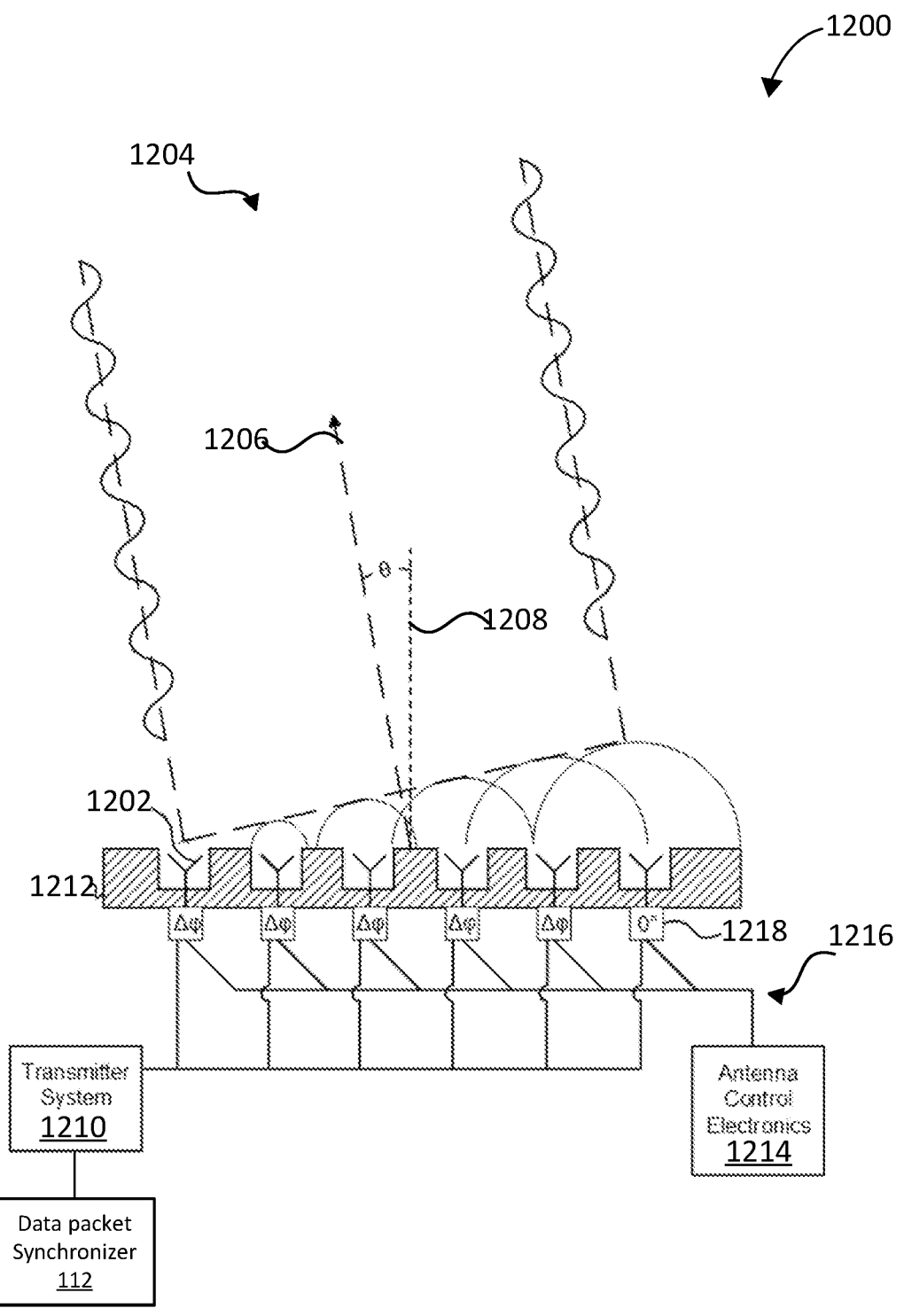
FIG. 12 illustrates a simplified schematic of an antenna, according to embodiments of the present disclosure.

FIG. 12 illustrates a simplified schematic of an antenna 1200, according to embodiments of the present disclosure. The antenna 1200 may be a component of the antenna system 1202 of FIG. 12. As illustrated, the antenna 1200 is a phased array antenna that includes multiple antenna elements 1202. Interference between the antenna elements 1202 forms a directional radiation pattern in both transmitter and receiver arrays, forming a beam 1204 (beam extents shown as dashed lines). The beam 1204 is a portion of a larger transmission pattern (not shown) that extends beyond the immediate vicinity of the antenna 1200. The beam 1204 is directed along a beam vector 1206, described by an angle "0" relative to an axis 1208 normal to a surface of the antenna 1200. As described below, the beam 1204 is one or more of steerable or shapeable through control of operating parameters including, but not limited to, a phase and an amplitude of each antenna element 1202.

In FIG. 12, the antenna 1200 includes, within a transmitter section 1212, the antenna elements 1202, which may include, but are not limited to, omnidirectional transmitter antennas coupled to a transmitter system 1210, such as the downlink transmitter 1050 of FIG. 10. The transmitter system 1210 provides a signal, such as a downlink signal, to be transmitted to a ground station on the surface. The downlink signal is provided to each antenna element 1202 as a time-varying signal that may include several multiplexed signals. In some embodiments, the data packet synchronizer 112 determines whether to send the downlink signal to each antenna element 1202, as described above. To steer the beam 1204 relative to the axis 1208, the antenna 1200 (e.g., phased array antenna system) includes antenna control electronics 1214 controlling a radio frequency (RF) feeding network 1216, including multiple signal conditioning components 1218 interposed between the antenna elements 1202 and the transmitter system 1210. The signal conditioning components 1218 introduce one or more of a phase modulation or an amplitude modulation (e.g., by phase shifters), as denoted by "Δφ" in FIG. 12, to the signal sent to the antenna elements 1202. As shown in FIG. 12, introducing a progressive phase modulation produces interference in the individual transmission of each antenna element 1202 that generates the beam 1204.

The phase modulation imposed on each antenna element 1202 can differ and can be dependent on a spatial location of a communication target that determines an optimum beam vector (e.g., where the beam vector 1206 is found by one or more of maximizing signal intensity or connection strength). The optimum beam vector may change with time as the communication target 1110 moves relative to the antenna 1200 (e.g., phased array antenna system).

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication subsystem comprising:
a first digital beamforming (DBF) device comprising:
  a data transmission interface;
  a first processing device operatively coupled to the data transmission interface, wherein the first processing device is configured to:
    receive a data packet from the data transmission interface, wherein the data packet comprises (i) in-phase and quadrature (IQ) data and (ii) a first timestamp representing a first time at which to transmit the IQ data; and
    send the IQ data at a second time when the first time is equal to a current local time of the first processing device; and
    send the IQ data at a third time after the second time when the first time is greater than the current local time and less than a fourth time; and
    discard the IQ data when the first time is less than the current local time or greater than the fourth time, wherein the fourth time is determined by offsetting the current local time by an amount corresponding to a size of a packet buffer of the first processing device.

2. The communication subsystem of claim 1, wherein the data packet further comprises error correction information and the first processing device discards the data packet upon a determination that the data packet contains uncorrectable errors.

3. The communication subsystem of claim 2, wherein to determine that the data packet has the uncorrectable errors, the first processing device is configured to:
  (i) detect, using the error correction information, multiple bits missing from the data packet; or
  (ii) determine that a first value of metadata does not match a second value expected by the first processing device.

4. The communication subsystem of claim 1, wherein the first processing device corrects a correctable error upon a determination that the data packet contains a correctable error.

5. The communication subsystem of claim 1, wherein the first processing device discards the data packet if the packet buffer is at capacity.

6. The communication subsystem of claim 1, further comprising a second processing device operatively coupled to a first SerDes link, the first SerDes link operatively coupled to the data transmission interface, the second processing device configured to:
  receive, from upstream circuitry, in-phase and quadrature (IQ) data;
  generate the first timestamp representing the first time at which to send the data packet;
  generate the data packet using the IQ data and the first timestamp; and
  send the data packet to the first processing device through the first SerDes link.

7. The communication subsystem of claim 6, further comprising:
  a second SerDes link;
  a third processing device operatively coupled to the second SerDes link, the third processing device configured to receive data from the second SerDes link; and
  a fourth processing device operatively coupled to (i) the second processing device and (ii) the second SerDes link, the fourth processing device configured to:
    receive, from the second processing device, the data packet;
    send the data packet to the third processing device through the second SerDes link responsive to a determination that the first timestamp matches an expected value of the fourth processing device; and
    discard the data packet responsive to a determination that the first time is not identical to the expected value of the fourth processing device.

8. The communication subsystem of claim 7, wherein the fourth processing device generates a second timestamp responsive to a determination that the second processing device failed to send the data packet to the fourth processing device.

9. The communication subsystem of claim 7, wherein the second processing device is a component of a first modem, the third processing device is a component of a second DBF device, and the fourth processing device is a component of a second modem, and wherein the first DBF device, the second DBF device, the first modem, and the second modem operate within a wireless satellite communication environment.

10. A method for operating a communication subsystem, the method comprising:

receiving, by a first processing device operatively coupled to a data transmission interface of a first digital beam-forming (DBF) device, a data packet from the data transmission interface, wherein the data packet comprises (i) in-phase and quadrature (IQ) data and (ii) a first timestamp representing a first time at which to transmit the IQ data; and sending, by the first processing device, the IQ data at a second time when the first time is equal to a current local time of the first processing device; and sending, by the first processing device, the IQ data at a third time after the second time when the first time is greater than the current local time and less than a fourth time; and discarding, by the first processing device, the IQ data when the first time is less than the current local time or greater than the fourth time, wherein the fourth time is determined by offsetting the current local time by an amount corresponding to a size of a packet buffer of the first processing device.

11. The method of claim 10, further comprising:

determining, by the first processing device, that the data packet contains uncorrectable errors; and discarding, by the first processing device, the data packet responsive to determining that the data packet contains uncorrectable errors.

12. The method of claim 11, wherein determining that that the data packet contains uncorrectable errors comprises:

detecting, using error correction information, multiple bits missing from the data packet; or determining that a first value of metadata does not match a second value expected by the first processing device.

13. The method of claim 10, further comprising:

determining, by the first processing device, that the data packet contains a correctable error; and correcting, by the first processing device, the correctable error.

14. The method of claim 10, further comprising discarding the data packet if a packet data of the first processing device is at capacity the packet buffer does not have sufficient space for the data packet.

15. The method of claim 10, further comprising:

receiving, by a second processing device operatively coupled to a first SerDes link, the first SerDes link operatively coupled to the data transmission interface, the IQ data;

generating the first timestamp representing the first time at which to send the data packet;

generating the data packet using the IQ data and the first timestamp; and sending the data packet to the first processing device through the first SerDes link.

16. The method of claim 15, further comprising:

receiving, by a fourth processing device operatively coupled to (i) the second processing device and (ii) a second SerDes link, the data packet, the second SerDes link being coupled to a third processing device configured to receive data from the second SerDes link;

sending the data packet to the third processing device through the second SerDes link responsive to a determination that the first timestamp matches an expected value of the fourth processing device; and discarding the data packet responsive to a determination that the first time is not identical to the expected value of the fourth processing device.

17. The method of claim 16, further comprising: generating, by the fourth processing device, a second timestamp responsive to a determination that the second processing device failed to send the data packet to the fourth processing device.

18. The method of claim 16, wherein the second processing device is a component of a first modem, the third processing device is a component of a second DBF device, and the fourth processing device is a component of a second modem, and wherein the first DBF device, the second DBF device, the first modem, and the second modem operate within a wireless satellite communication environment.

* * * * *